United States Patent
Carmein

[11] Patent Number: 6,152,854
[45] Date of Patent: Nov. 28, 2000

[54] OMNI-DIRECTIONAL TREADMILL

[76] Inventor: David E. E. Carmein, 9200 Russell Ave. South, Bloomington, Minn. 55431

[21] Appl. No.: 09/255,162

[22] Filed: Feb. 22, 1999

Related U.S. Application Data

[63] Continuation of application No. PCT/US96/14016, Aug. 27, 1996.

[51] Int. Cl.[7] .................................................. A63B 24/00
[52] U.S. Cl. .............................. 482/4; 482/54; 482/902; 434/247; 198/779
[58] Field of Search .............................. 482/1–9, 52, 54, 482/55, 57, 71, 72, 900–903; 434/247; 73/379.01; 198/370.01–370.03, 371.01–371.03, 779, 840; 345/418, 473, 952

[56] References Cited

U.S. PATENT DOCUMENTS

| | | |
|---|---|---|
| D. 340,342 | 10/1993 | Nummelin et al. . |
| 3,451,526 | 6/1969 | Fernandez . |
| 3,550,756 | 12/1970 | Kornylak . |
| 4,868,682 | 9/1989 | Shimizu et al. . |
| 5,186,270 | 2/1993 | West . |
| 5,229,756 | 7/1993 | Kosugi et al. . |
| 5,238,099 | 8/1993 | Schroeder et al. . |
| 5,314,391 | 5/1994 | Potash et al. . |
| 5,385,519 | 1/1995 | Hsu et al. . |
| 5,490,784 | 2/1996 | Carmein . |
| 5,495,576 | 2/1996 | Ritchey . |
| 5,562,572 | 10/1996 | Carmein . |

*Primary Examiner*—Joe H. Cheng

[57] ABSTRACT

A treadmill (1) having a track assembly that allows a user (3) to walk or run in any arbitrary direction. A movable user support has a plurality of rotatable members that rotate about axes normal to the direction of movement of the user support (2). Separate power drive mechanism (7) (8) concurrently move the user support (2) and rotate the members to omni-directional user movement. A control (4) for the power driven mechanism (7) (8) is responsive to the directional orientation of the user on the user support (2) to cause the user support (2) to operate in the direction of the orientation of the user (3).

36 Claims, 13 Drawing Sheets

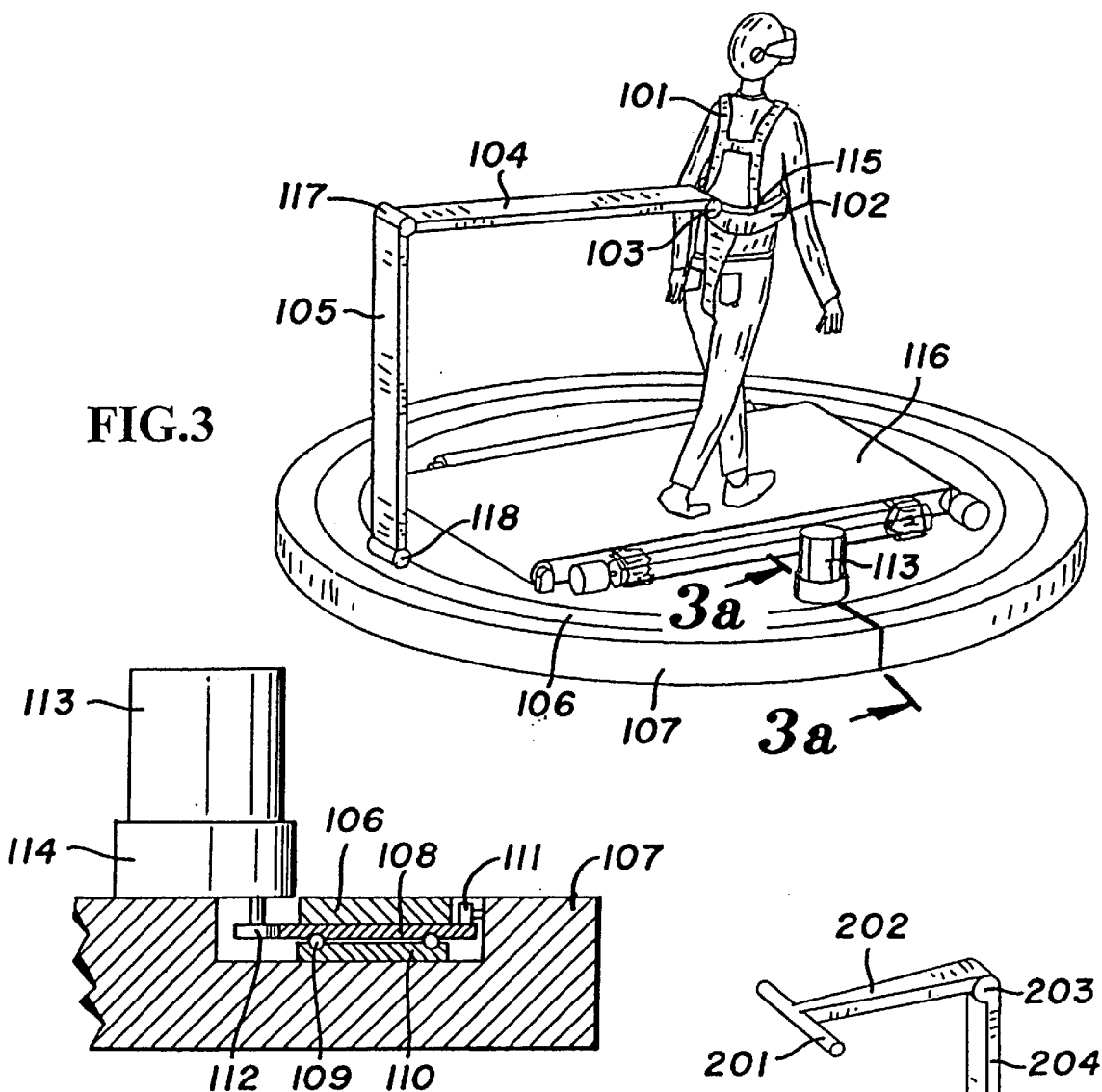
FIG.3
FIG.3a
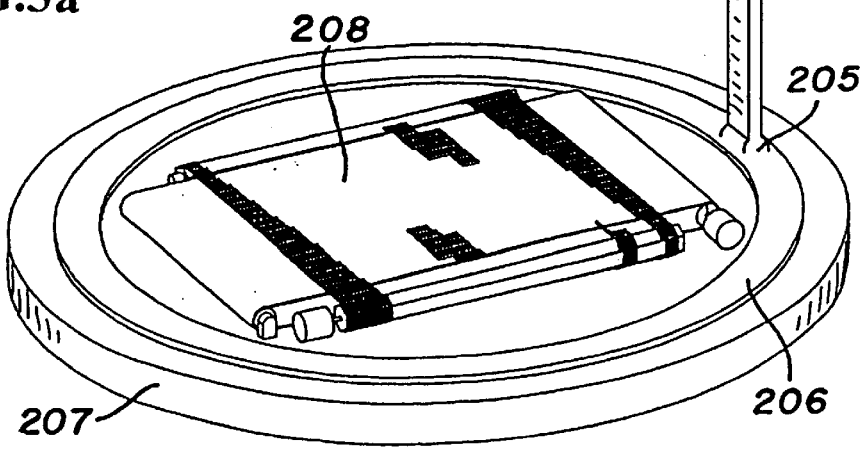
FIG.4

OMNI-DIRECTIONAL TREADMILL

This application is a Continuation of International application No. PCT/US96/14016 filed Aug. 27, 1996.

FIELD OF THE INVENTION

The invention is in the field of human rehabilitation, simulation, training, exercise equipment, and generally methods that permit the user of the equipment to walk, run or crawl in any arbitrary direction and employing haptic sensing to increase a user's level of immersion in the simulated environment.

BACKGROUND OF THE INVENTION

Virtual Reality (VR) typically employs computer-generated stimulation of the human sensorium to simulate naturally occurring inputs such as sight and sound. Additional senses which may be stimulated include orientation, balance, and touch and force (haptic) feedback. A complete and immersive VR experience might simultaneously stimulate a user with sight, sound, touch, and movement.

A major limitation in state-of-the-art VR is the inability to permit simple walking and running. Navigation is typically experienced as a disembodied center of consciousness which is directed by pointing, other gesture or by manipulation of a joystick, trackball, mouse, or similar device. The actual physical sensation of walking is limited to one of two forms: a) The user is restricted to a confined and immobile surface where tracking and signal generation are well-controlled, and b) the user is confined to a device such as a linear treadmill or wheelchair which transduces the user's linear motion from real space to virtual space. The conventional linear treadmill has a movable track which may optionally be upwardly inclined. The track is only movable in one direction which restricts motion of the user to the direction of movement of the track. A monitor, such as a motivational electric display, associated with the track, records the time, speed, and distance accomplished by the user.

Use of a linear treadmill in a virtual environment consists of, one continuous moving track, and in conjunction with an external monitor or head mounted-display permits a user to walk in a straight line. The user cannot step in arbitrary directions as s/he would be able to in real life. This limitation in navigation detracts from the immersive nature of the experience, and requires that the experience takes on more of a vehicular nature rather than that of a freely walking and navigating body.

SUMMARY OF THE INVENTION

The invention describes herein is most similar to a linear treadmill in that the user is able to walk or run in an upright manner. The user may also employ proprioceptive sensing to imbue a sense of touch to the simulated environment. Alternatively, the user may assume any of a manner of postures with respect to the planar active surface. Other postures include kneeling, crawling on hands and knees, belly crawling, and sitting and lying prone.

The invention is an omni-directional treadmill apparatus that allows a user, such as a person, to move, walk, run or crawl in any arbitrary direction. The apparatus has a frame for supporting the apparatus on a fixed surface. A track assembly mounted on the frame provides a user support that moves in a direction determined by directional orientation of the user on the track assembly. The track assembly has a user support movable in first direction by a first drive motor. The user support includes user support members rotatable about axes generally normal to the direction of movement of the support. A second drive, such as a power driven endless belt, engages the user support members to rotate the user support members whereby the combined movement of the user support members and user supports results in omni-directional user movement. Controls responsive to the directional orientation of the user on the user support drives which in turn controls the directional user movement to conform with the orientation of the user on the user support.

DESCRIPTION OF THE DRAWINGS

FIG. 3 is a perspective view of a first modification of the treadmill of the invention;

FIG. 3a is an enlarged sectional view taken along line 3a—3a of FIG. 3;

FIG. 4 is a perspective view of a second modification of the treadmill of the invention;

DETAILED DESCRIPTION

Figure 1:
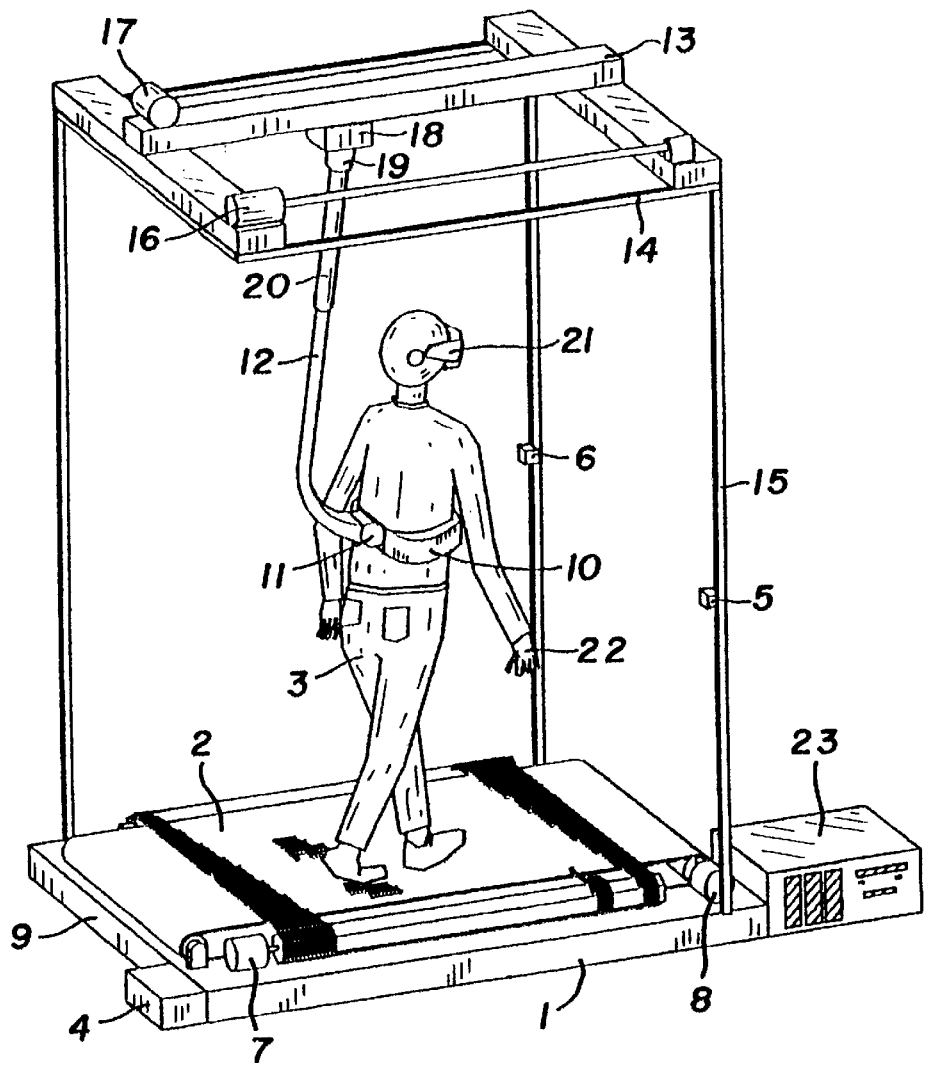
FIG. 1 is a perspective view of the omni-directional treadmill of the invention.

The invention avoids the limitations of a traditional treadmill by permitting a user to walk in any arbitrary direction. FIG. 1 depicts an Omni-Directional Treadmill (ODT) 1 with an active surface 2 which cleverly employs a unique mechanism by which a user 3 positioned at any location on the active surface may be transported to any other point an that surface. More typically, a user who is headed off the active surface is moved back toward the center of the surface analogous to the way a linear treadmill prevents a user from running off the front or being flung off the back.

Integral to the ODT is a closed-loop motor control mechanism 4 and a user position-sensing device 5, 6 which pinpoints the position of the user with respect to the fixed axes of the treadmill's active surface. These two work in concert with X axis control motor 7 and Y axis control motor 8 to ensure proper positioning of the user on the active surface, which is fixedly attached at selected points to a rigid base 9. In the embodiment of FIG. 1, the position sensors are ultrasonic transducers of a design well known to those skilled in the art of ultrasonic position sensing.

To address the problem of balance, the ODT optionally includes a means for steadying the user. A structure as simple as a circular railing may suffice. More preferable from the standpoint of transparency is the use of a balance cuff 10 which attaches near the user's center of balance. A hinge 11 at the small of the user's back connects the cuff 10 to a support strut 12 which serves to link the user with the X-Y tracking mechanism 13 of the support frame 14. Under normal circumstances, the cuff 10 permits active X-Y tracking of the user because the support strut 12 actively maintains a vertical position. In this fashion, the user barely knows the cuff 10 is there. When the user becomes unstable, however, the cuff 10 serves to assist in regaining balance.

In order for the cuff 10 and strut 12 to actively track the user in any orientation, the strut 12 is preferably connected to a support structure 14 directly over the user's head which is supported by at least three vertical support members 15. Two motors 16, 17 actuate the X-Y tracking means respectively to maintain the strut 12 in a vertical position with respect to the user. Motors are controlled by sensing the variance of the strut 12 from the vertical. A pair of X and Y potentiometers 18 sense the angular error of the strut 12 in the XZ plane and YZ plane respectively. An XZ error, for example, indicates that the X motor 16 must drive the mechanism n the direction to reduce the error to zero. Likewise for an error in the YZ plane controlling the Y motor 17. Rotations about Z caused by the user turning are passed through a slip ring assembly 19. The slip-ring assembly 19 prevents a winding or twisting of the strut 12, and also permits passage of electrical power and signals through rotary electrical contacts so that a connection may be maintained with the equipment worn by the user. Slip-ring assemblies are readily known to those familiar with rotary electrical contacts. In a similar fashion, the vertical motion of the user is permitted by an extension mechanism 20. The extension mechanism 20 allows only linear motion, and permits passage of electrical signals to and from the user.

The preferred embodiment of the device is a combined ODT/VR system as revealed in FIG. 1. It allows close coupling of the user's physical direction and velocity with that of the virtual world in which the user is navigating. Such a system might typically include a head mounted display (HMD) 21 with speakers and microphone, data glove(s) 22, a body sensing suit (not shown), exoskeletal joint angle sensors, and/or other related apparatus. Said VR system would likely include a computer 23 for image generation, sound generation, and processing of related data such as head and hand position. Though not explicitly shown, peripherals worn by the user are hard-wire connected to the computer system through wires running up the strut 12, through the X-Y tracking support 13, and down the support frame vertical member 15. Wireless connections are also possible using electromagnetic or infrared means.

The ODT works in synchrony with the VR system by sending velocity and direction signals to the image generation computer. The computer uses the velocity vector thus provided to update what is shown to the user so that the user sees a visual image which takes into account this vector. For example, if the user's velocity is ½ meter/sec in the X direction as indicated by the X direction motion of the treadmill, the user will observe objects within the virtual world passing by at ½ meter/sec in the minus x direction.

Variations of the combined ODT/VR system include the ability to tip the platform to simulate uphill travel, and networked VR experiences in which one user shares a virtual world with others.

Additional variations to the ODT/VR system include integration of sensing and stimulation systems. Examples of additional sensing might optionally include full or partial human surface mapping, video capture, or their combination, which can then be manipulated and transported as the user's virtual image. A companion traveller in virtual space would then see a real-time facsimile of the user.

A further enhancement of immersion and realism within the virtual environment may be achieved by addition of force feedback to the user's whole body rather than just a specific appendage. A main object of a downhill direction as well.

A user on a treadmill without force feedback is not doing significant work. Through the basic definition of work equals force times distance, we see that a user without an externally applied force is not able to exert work. The only exertion by the user is to lift and place legs and to generally maintain balance through placement of arms and body motion.

By applying external force, typically at or near the user's center of mass, the system permits the user to do work. Force applied to the user is matched by an average equal and opposite force of the feet upon the treadmill. If the treadmill surface is moving, the user is made to do work per the basic equation: work is equal to the sum of the applied forces of each foot times the distance traveled as the force is applied. The rate at which that work is done is determined by the velocity of the action surface and is equal to the power exerted by the user.

With reference to FIG. 1, the user 3 is walking on the ODT's active surface 2 and is coupled to a force feedback system through a centrally located cuff 10. The cuff is attached to a strut 12 which can be made to apply appropriate amounts of force at selected height in a direction generally opposite to the linear direction of travel. A generally equal and opposite force is generated by the user on the surface of the treadmill, and that force occurs along the same linear direction as the direction of the treadmill's surface velocity. It is the force of exertion along the direction of motion at velocity V which demands exertion from the user.

Externally applied force as described above, may be straightforwardly combined with a tilted active surface to enhance the illusion of traveling uphill. In addition, the angle of the applied force may be varied to simulate various loading conditions.

Figure 2:
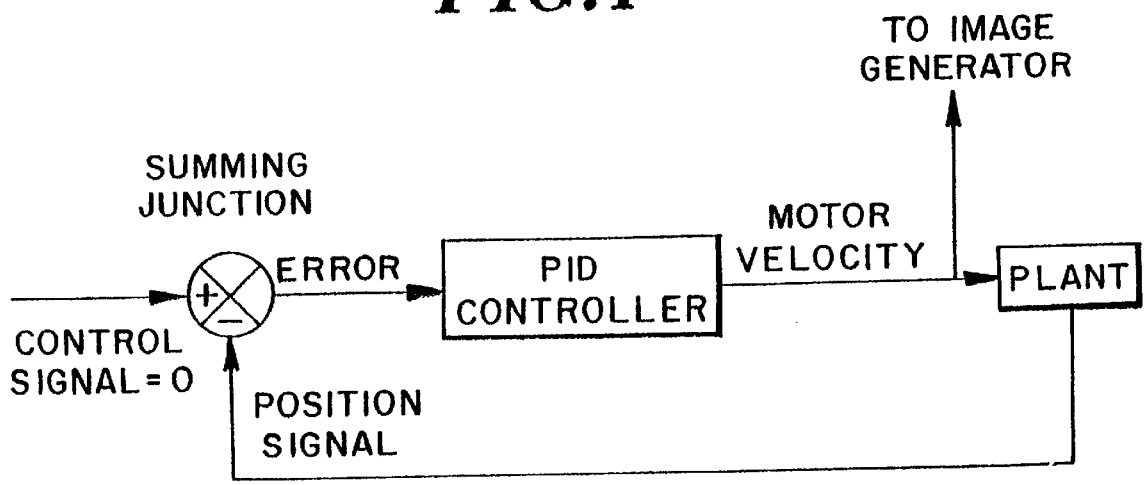
FIG. 2 is a block diagram of the motor control of the treadmill.

FIG. 2 is a block diagram for the control of a single motor. This motor and its affiliated control loop may actuate either the X or Y control for either the active surface or the support cuff tracker.

With reference to FIG. 2, for a single axis of the active surface, the Control Signal is set for zero at the center of the surface. If the position Signal is off-center, the Summing Junction generates an Error signal which is proportional to the error. A PID (proportional-integral-differential) Controller, which is well known and well characterized to those familiar with the art of motion control, is tuned to interpret the error signal over time, outputting a signal which controls motor velocity along one axis. Motor velocity and its associated direction are interpreted by the VR system as a velocity and a direction, and the image presented to the user is updated accordingly. Motor velocity also causes the active surface to be driven in a direction which reduces the Error. The Plant represents the system components, including the user, which are responsible for generation a position signal. In this case, the plant includes the active surface as it is driven back toward center, the user, who is being driven back toward center by the motion of the surface, and the position transducers, which sense the absolute position of the user with respect to the zero reference position, and generate the Position Signal which may be resolved by the Summing Junction.

Control of a support cuff tracking motor occurs in a similar fashion. With reference to FIG. 2, the Control Signal is set for zero when the support strut is vertical with respect to its active axis. If the Position Signal shows an angle other than zero, an Error signal is generated which is proportional to the angular error. The PID controller outputs a signal for the motor controlling the axis of interest, which turns at the specified velocity. The Motor Velocity drives the mechanism of the Plant in the direction to reduce the error to zero, and the next cycle is begun again. In the device of FIG. 1, the position signal might be generated by a rotary potentiometer 17 which is affiliated with the axis of interest.

An alternative embodiment of the cuff support is shown in FIG. 3. The user 101 is shown wearing a harness 102 rather than a cuff 10 of the type shown in FIG. 1. In this case the harness is flexibly connected through a hinge 103 to a rigid horizontal member 104. Said member is hingedly connected to a vertical member 105, which is hingedly connected to a rotating fixture ring 106. Ring 106 is rotatably held within the base 107. In the section view we see that the fixture ring is fastened to a gear ring 108 which rests on a dual bearing race 109 supported by a bearing ring 110. The gearing is restrained from transverse movement by the bearing race grooves, and is constrained in the upward direction by roller contacts 111. Ring 106 is driven about its center by geared contact with a spur gear 112, which is driven by the drive motor 113 through a gear reduction means 114.

Shear sensors within the cuff 115 of at the hinge 103 generate a signal which is analogous to the Error signal of FIG. 2. The motor 113 drives the ring in a direction to reduce the shear sensor output toward zero. In this manner the cuff and support struts track the user's position, providing support and balancing assist to the user along with a hard-wired connection to the HMD and sound system. In all other respects, the active surface 116 of the ODT behaves the same as that in FIG. 1. For clarity, the position sensors, motor drivers, and computers are omitted form the FIG. 3.

Even better support may be provided to the user by making the hinge support 117 of the horizontal member 104 and the hinge support 118 of the vertical member active members, i.e., they can be actively damped. Active damping would sense the rate at which the user is moving, and would increase damping in proportion to the velocity of movement. In this way, if the user should fall or loose balance, the rapid change in velocity would cause much increased damping at the hinges, and would provide the support needed to regain balance.

A non-motorized version of the embodiment of FIG. 3 would employ a hand grip for steadying balance, as shown in FIG. 4, rather than the actively tracking cuff of FIGS. 1 and 3. The hand grip 201 attaches through a horizontal member 202 through a hinge 203 to a vertical member 204. The vertical member 204 is attached through a hinge 205 to a ring 206 of the type depicted in FIG. 3 which is rotatably attached to the base 207. Because the ring rotates around the user (not shown) under power of the user, there is no motor. The user would always have at least one hand on the hand grip, and would apply forward and backward force, and torque to the handle to properly position it as they moved about the active surface 208. This embodiment of the invention, though reduced in features, would be lower cost to manufacture and would require less ceiling height. The unit could be comfortably installed in the home or office without special height or power requirements. For clarity, the user, position sensors and computers are omitted from the FIG. 4.

Figure 5A:
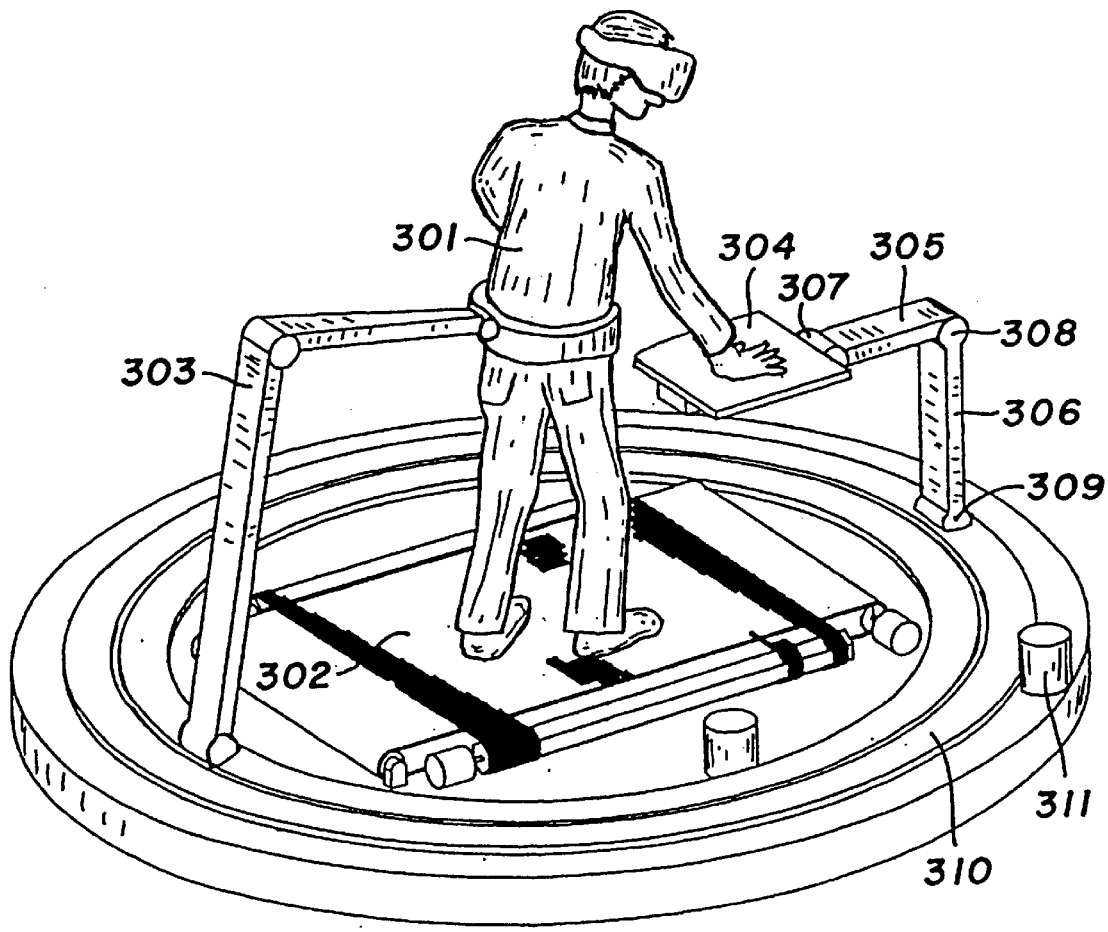
FIG. 5a is a perspective view of a third modification of the treadmill of the invention.
Figure 5B:
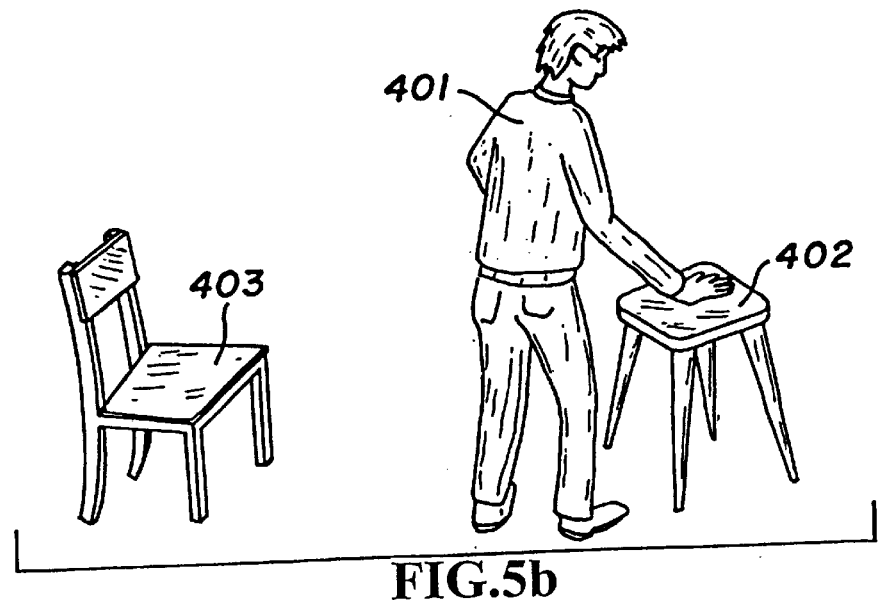
FIG. 5b is a perspective view of a section of the track assembly employed in the treadmills of FIGS. 1 to 5.

Haptic interaction may be accomplished through use of passive or dynamic "interactive solids" also referred to generally as "haptic displays." FIGS. 5a and 5b show how such haptic displays might interact with the user. FIG. 5a depicts a user in real space. Here we see the user 301 standing on the ODT 302, supported as before by a cuff and strut assembly 303. The user is reaching out and touching a flat, horizontal surface 304 upon which he is about to sit. The surface 304 is controllably placed by a motorized strut assembly consisting of a horizontal member 305, a vertical member 306, and hinge control motors 307, 308, 309. This positioning assembly is fixedly mounted on a secondary mounting ring 310 of the type first shown in FIG. 3a. The ring 310 is powered and positioned by a motor 311 in a fashion similar to that of the motor depicted in FIG. 3. The surface 304 may be controllably placed by suitable rotation of the ring 310, and turning of the hinge motors 307–309.

FIG. 5b depicts visual reality as seen by the user of FIG. 5a. In the virtual space of FIG. 5b, the user 401 sees and physically interacts with the surface of FIG. 5a where it appears as a chair 402. This is an example of a dynamic interactive solid because it passively interact with the user to solidify the synthetic visual reality. Once the solid finds its place the user's real and virtual space, it remains fixed. A second chair 403 which is within the user's virtual work is also available to sit upon. If the user were to choose the second, lower chair, he would simply turn and walk to that chair. The ring 310 of FIG. 5a will swing the interactive solid 304 to correspond with the anticipated surface of the second chair, and the user may touch it and sit upon it.

A dynamic interactive solid differs from the passive one described above in that it actively responds to a user's input, input from a user sharing the same virtual space, or an operator completely outside the virtual environment. A dynamic interactive solid responding to a user might be, as in the previous example, a horizontal surface which represents the top of a floating surfboard. As the user pushes down, the surface, under the closed loop control of an external computer, provides the same bobbing and floating response that a real surfboard would provide. A more complete dynamic interactive solid might be a mechanical hand which is felt by the user but controlled by another within the virtual environment. The user might squeeze and shade the hand, and it will squeeze and shake back in response because the parallel user is squeezing and shaking an identical hand in his or her own virtual environment.

Passive and dynamic interactive solids are not restricted to the circular-ring embodiments of FIGS. 3 to 5. They may just as easily be implemented within the embodiment of FIG. 1 and its related variations. An example of such a hybrid system would include above-mounted cuff support, passive and dynamic interactive solids.

The invention is not restricted to the use of a balance cuff. ODT's with larger surface areas and gentle centering action may not need a cuff to support and balance a user. A large active surface area allows restorative forces to be gentle enough to avoid upsetting the user's balance.

Interactive solids are referred to the literature as "haptic displays" or "roboxels". Related work has evolved interactive surfaces such as circular plates and shafts with torque feedback (Good, U.S. Pat. No. 5,185,561). It is in the spirit of the invention to optionally include both passive and dynamic interactive, reality-enhancing means as integral to the function of the ODT.

USES

By itself, the ODT is useful as:
1. An exercise device
2. A motion analysis device for movement in arbitrary directions
3. A Training device for lateral moves in arbitrary directions Combined with the VR system, the ODT is useful for:
1. Virtual space navigation
2. Training
3. Telepresence
4. Entertainment
5. Exercise
6. Recreation
7. Motion analysis
8. Education
9. Psychological analysis and therapy

DETAILED DESCRIPTION

Basic Mechanism

In order for an active surface to move a resting mass in any direction it must have available two active vector motion components, plus and minus X, and plus and minus Y. A linear treadmill has only +/−X. the ODT has both.

The ODT employs a "vector thrust drive" which mechanically separates the two motion components so that they can be powered and controlled by two separate motors. The vector thrust is the vector sum of the X motion component and the Y motion component.

Figure 6:
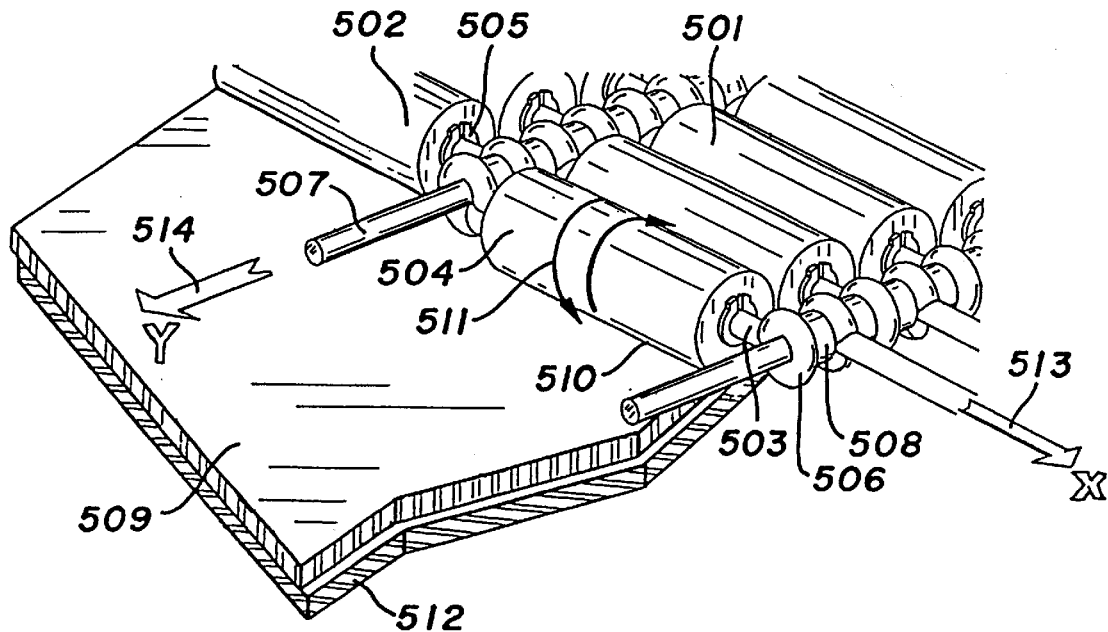
FIG. 6 is a perspective view of a section of the track assembly employed in the treadmills of FIGS. 1 to 5.

As shown is FIG. 6, the active surface 501 of the ODT, hereinafter referred to as the roller belt, is comprised of a multiplicity of identical roller segments 502. A roller segment consists of a rigid shaft 503 upon which is mounted a freely rotating roller 504 which is kept within its lateral boundaries by spring clips 505 fastened at the ends of the shaft. Ends of the shaft are formed into eye hooks 506, which, in turn, are held around a common hinge axis by a hinge rod 507. Contact points of individual eye hooks are separated by spacers 508 to properly position them and to prevent lateral motion. Each roller frictionally abuts a surface 509, preferably a flexible belt, moving at right angles to the motion of the roller segments, along a line of contact 510 which serves to create selective rotational motion 511 to the roller. The flexible belt is supportively abutted by a rigid support plate 512 which substantially takes the load of the user's weight, and ensures that the active surface remains flat.

X-direction motion 513 of the roller belt 501 is driven by the X-direction motor 7 of FIG. 1. Y-direction motion 514 of the flexible belt 509 is driven by the Y-direction motor 8.

Figure 7:
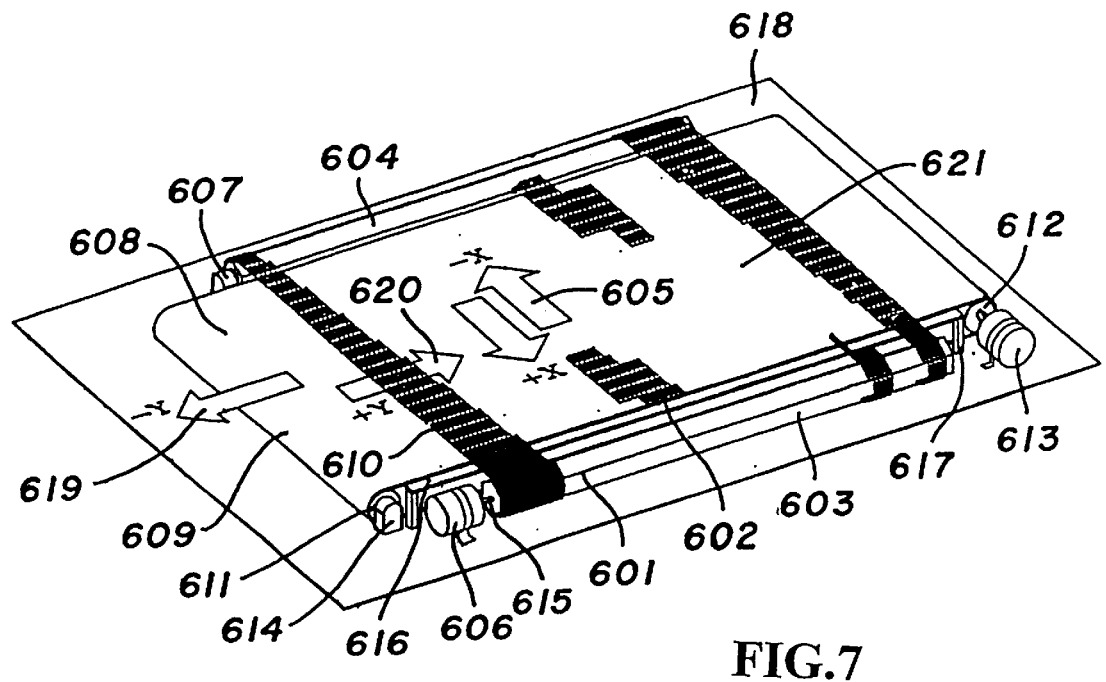
FIG. 7 is a perspective view of the track assembly employed in the treadmills of FIGS. 1 to 5.

FIG. 7 shows the complete mechanism for achieving full omni directional motion, and shows that the hinge rod 601 permits the roller belt 602 to flex around rollers 603, 604 at the belt edges. Hex rollers actuate the roller in the +/−X vector direction 605. As shown, rollers are hexagonal in shape to accommodate the hinged nature of the roller belt.

In the embodiment of FIG. 7, one hex is powered by a motor 606 while the other is an idler 607, although both rollers could easily be powered. The linearly actuated planar surface 608, which is the top surface of a flat, closed-loop drive belt 609 is placed in intimate contact with the bottom surface of the roller belt 610, and oriented so that its motion is at right angles to the motion of the roller belt. It is supported and directed at its ends by rollers 611, 612. In the preferred embodiment, only one roller is actuated by a motor 613; the other is an idler roller.

Rollers are supported by bearing 614, or by a motor drive shaft 615. The bottom surface of the flat, flexible drive belt 609 is supportively abutted by a rigid support plate 616 which is supported at each of its four corners by support legs 617. The support legs, bearings, and motors are securely fastened to a rigid support surface 618 which serves as ground.

When the roller belt alone is actuated, the top of the roller provide +/−X motion. When the flat belt alone is actuated, it frictionally contacts the bottom surface of the rollers, thus causing them to rotate about their free axis. So, if the belt is moving in the −Y direction 619, the top surface of the rollers is moving in the +Y direction 620, Since the contact lines at the top of each roller are moving in concert, a mass resting on the active surface 621 defined by the sum of the contact lines is moved in the direction of the combined X and Y motion vectors. The active surface of this FIG. 621 may be identified with the active surfaces 2, 116 and 208, shown in FIG. 1, 3 and 4.

Figure 8:
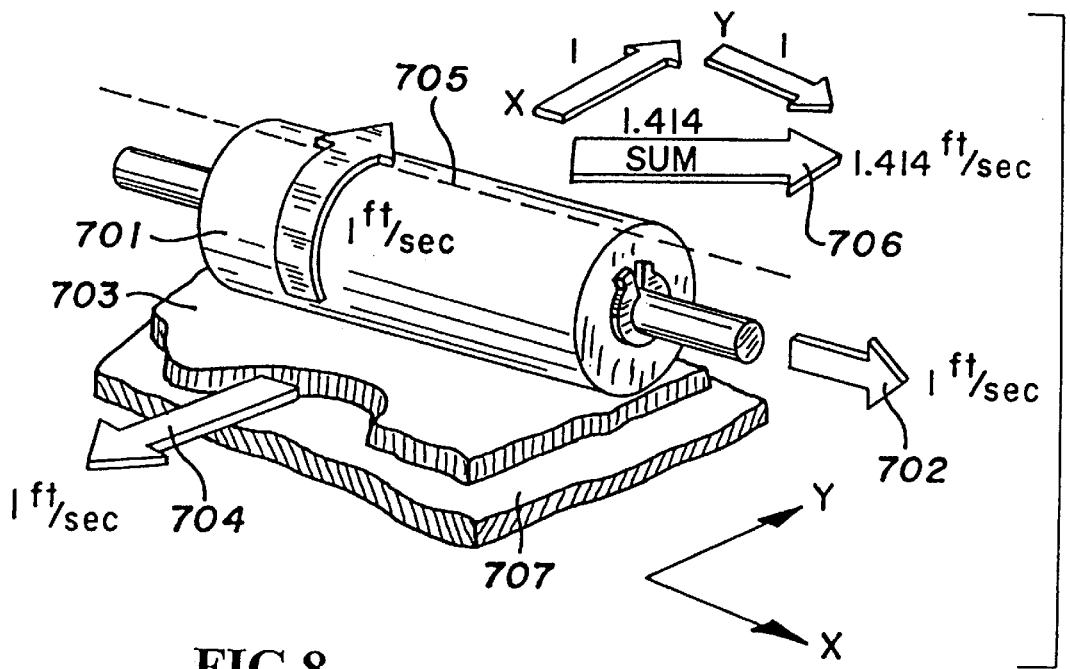
FIG. 8 is a diagrammatic perspective view similar to FIG. 6 showing the movement of the rotatable sleeves and sleeve drive belt.

By actuating the beaded belt and the flat simultaneously, the surface contacts lines of the rollers may by made to impart any combination of X and Y movement. For instance, in FIG. 8 we see a roller segment 701 moving at plus 1 foot/second in the minus Y direction 702, and the flat belt 703 is moving at minus 1 ft/second in the minus Y direction 704. The freely-rotating roller converts the belt's −Y motion to a +Y motion at the contact line 705. The combined thrust vector 706 equals the vector sum of the two belt's motions, i.e., 1.414 ft/second at an angle of 45 degrees in the first quadrant.

For better stability, the underside of the flat belt is supported by a smooth, flat rigid surface 707. The interface surface between the flat belt 703 and the support surface 707 is preferably reduced in friction by coating with a slippery substance such as teflon.

A tensioning mechanism is advantageously employed on one of the two rollers in the X direction and one of the rollers in the Y direction, preferably the idler roller, so that any slack or relaxation of the belts may be taken up.

Rollers may be arbitrarily small or arbitrarily large. However, sensible limits are placed on roller size by factors such as ease of assembly. In addition, the size of the hexagonal rollers is determined by the length of the rollers and the hinge segment it defines. Obviously, there is an optimal roller size range for said assembly.

A hexagon shape has been arbitrarily chosen to depict the roller belt actuation means. the roller is not restricted to this shape; though it is reasonably expected that the roller will have between six and eight sides to optimize the balance between size and manufacturability.

Alternative Active Surface Mechanisms

Figure 9:
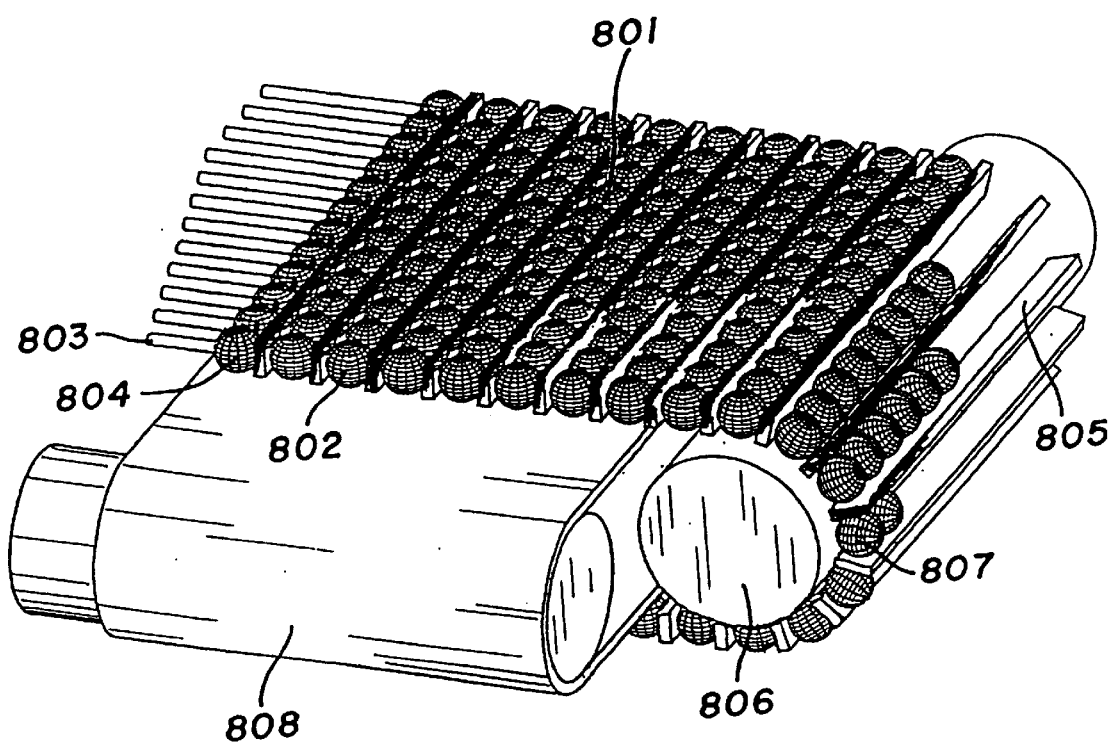
FIG. 9 is a perspective view of first modification of the track assembly useable with the treadmills of FIGS. 1 to 5.

The vector-slip principle may be employed with discrete components of another form as well. In FIG. 9 is seen one corner of the active surface of the ODT 801, which consists of a multiplicity of identical beaded segments 802. A beaded segment consists of a flexible cable 803 upon which is strung a number of a beads 804. The cable is fastened end to end to form a closed loop. Beads are separated by spacers 805. Spacers serve two purposes. For one, they ensure a uniform bead spacing. Two, they impart linear force to the beads 804 as the cable is pulled in either direction. Without the spacers 805 attached to the cable 803, the cable 803 would tend to pull through the beads 804 rather then force them in the desired direction.

Rollers 806 (only one shown) support and direct the return loops 807 at the segment ends. Adjacent segments are fastened to each other by the spacer mechanisms 805. The combination of adjacent bead segments and their associated spacers forms a uniform surface to beads, which is directly analogous to the uniform surface of the roller belt. As with the roller belt system, said beads are actuated in the +/−X direction by one set of rollers, and are actuated in the +/−Y direction by contact with a flat belt 808.

Figure 10:
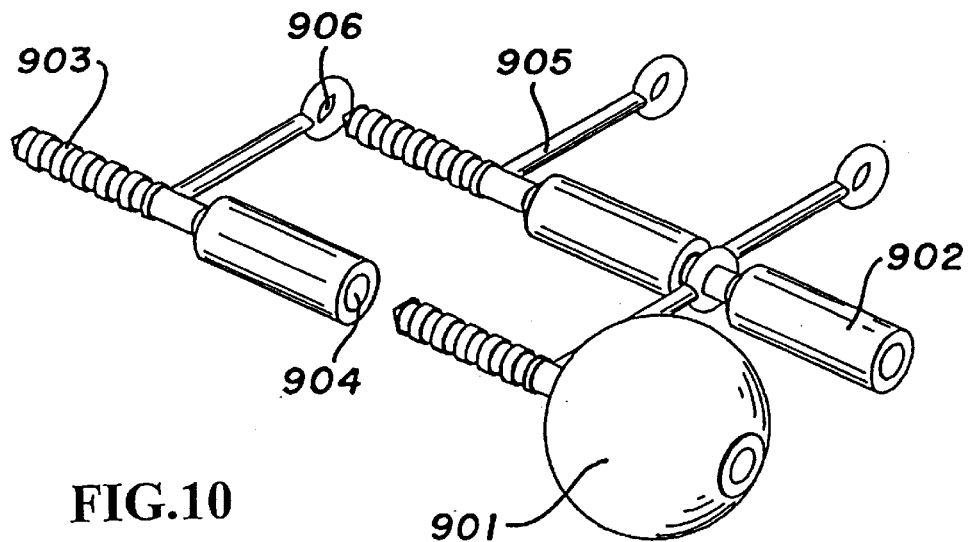
FIG. 10 is an exploded perspective view of a section of second modification of the track assembly useable with the treadmills of FIGS. 1 to 5.

Rather than stringing components on wire and fastening them together, it is also possible to fabricate a single, repeating construction unit which accomplishes the same function as the wire and bead assembly. FIG. 10 depicts such a repeating unit. A bead 901 or roller is rotatable mounted on a shaft 902 which has a male 903 a female 904 end as well as a connecting strut 905. Beads are connected into closed-loop strings by fastening the male portion of the assembly into the female. Connections between strings of beads are made by mounting the hole of the strut 906 over the male portion of the adjacent string. It is understood that said repeating, componentized structures are also suitable for construction of a roller-type unit which duplicate the function of the above-described roller belt.

Following assembly of all the bead segments which comprise a roller belt, the assembly will look much as that depicted in FIG. 9, except the spacers 805 will be an integral part of each unit assembly 905 as separate connecting struts.

Figure 11:
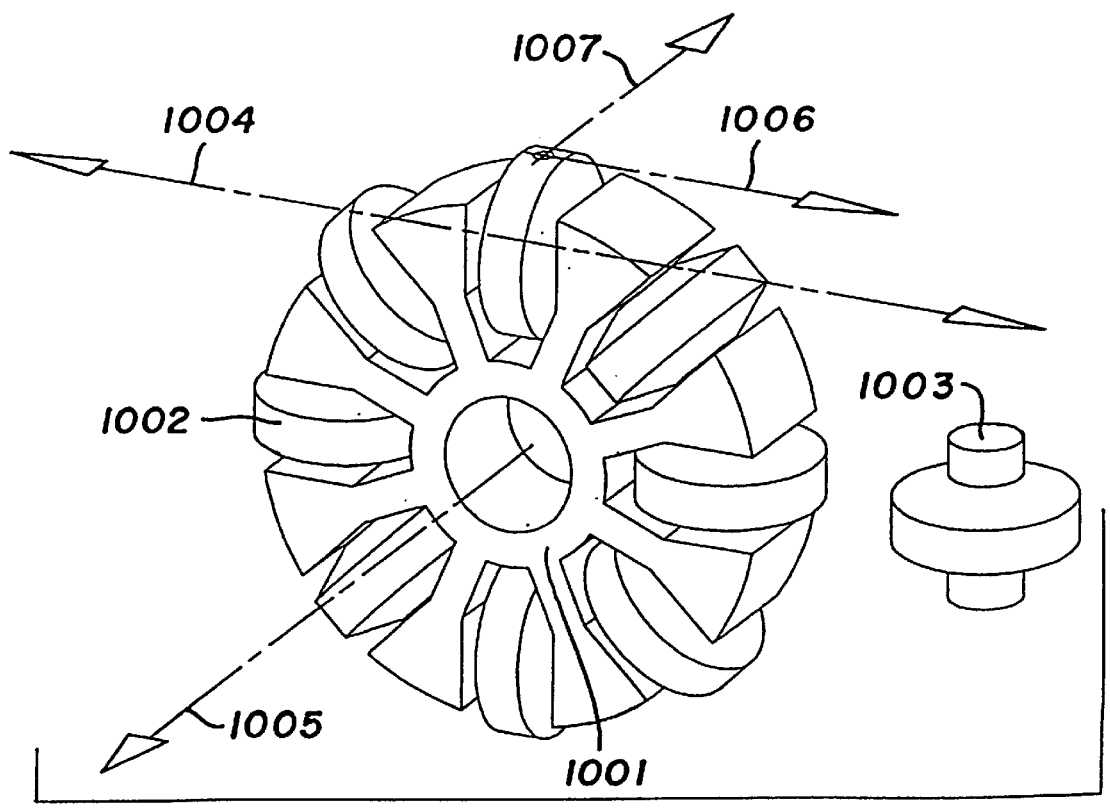
FIG. 11 is a perspective view of a modification of the omni-directional wheel and idler rollers.

FIG. 11 reveals yet another omni-directional surface actuation means which uses a wheel 1001 with idler rollers 1002 positioned around its circumference. An idler roller unit 1003 is inserted into the appropriate receptor notch in the wheel 1001. Each idler axis 1004 is oriented perpendicular to the powered axis 1005 of the wheel. The vector-slip wheel 1001 has the unique property of being able to transmit force only through a line perpendicular to the powered axis 1006, the x axis. Any motion which the wheel 1001 sees in the Y axis passes over the idlers 1007.

Figure 12:
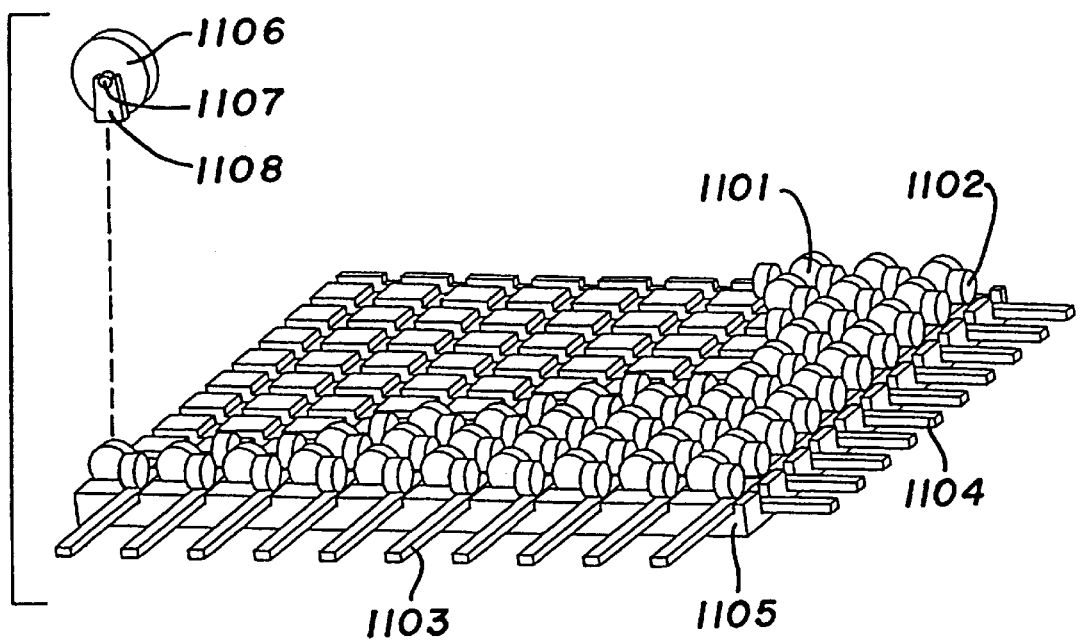
FIG. 12 is a perspective view of a third modification of the track assembly useable with the treadmills of FIG. 1 to 5.

FIG. 12 shows that by combining the above-described vector-slip wheel in an array of X oriented wheels 1101 and Y oriented wheels 1102, a combined direction vector may by achieved by selective actuation of the x and Y arrays. The wheels 1102 are actuated in the y direction by one set of belts 1103, and in the X direction by another set of belts 1104 which contact the bottoms of the wheels. These belts are held and directed by a base 1105 with guide grooves and mounts for the wheel arrays. Wheel 1106 is a typical X-direction wheel of the construction of FIG. 11. It is held onto the base by snap fitting its axis 1107 into snap grooves of a pair of mounting posts 1107, where only one post is shown. Every wheel is held onto the base in the same manner.

Because the X wheels 1001 are a larger diameter than the Y wheels 1102, the contacting belts do not come into contact with one another. As with the beaded belt invention, actuation of the X wheel array actuates motion in the +/−X direction which passes easily over the idlers of the Y vector-slip wheels with no hinderance. Pure Y motion is likewise unhindered by the X array. As long as a resting mass contacts a reasonable number of X and Y rollers, combining X and Y wheel arrays permits an active surface which is able to linearly actuate the resting mass in any direction through combination of the X and Y vectors.

Drive belts 1103, 1104 are continuous belts which are driven by rollers (not shown). The rollers are powered and controlled by motors in a fashion similar to the roller/motor combination of FIGS. 1 to 4 and FIG. 7.

Ergotech, Inc. makes an assortment of large rollers which employ shaped idler pulleys on their exterior which fall into the same class as the vector-slip wheel. Their use is as passive moving devices for boxes and other flat-bottomed articles.

Martin-Marietta has employed a vector-slip drive on a lunar rover 7. Their idler rollers are oriented at 45 degrees to the main wheel drive axis. Thrust is therefore always at 45 degrees to the main wheel drive axis. By proper combination of the four thrust vectors available from the four wheels, the rover is able to navigate in any arbitrary planar direction.

One advantage of the method of discrete construction units is that their hinged nature allows better control of the active surface topography. By making the material of the flat belt flexible and deformable, and by supporting the underside of the flat belt with a multiplicity of individually controllable idler rollers, each support point may be selectively raised or lowered. By selectively raising or lowered idler support points on the flexible underside of the flat belt, and by Pointedly connecting discrete construction units to form the beaded active surface, the active surface may be deformed with controllable bumps and depressions. The bumps and depressions might be advantageously shown as matching bumps and depressions in the virtual environment, thus enhancing the reality of the immersive experience.

In a comparable fashion, the vector-slip wheels of FIG. 11 and 12 may be individually raised and lowered to simulate a surface of varying texture. Since the vector-slip wheels are discrete units rather than tied in to a belt, they may be raised and lowered substantially more than their roller or bead counterparts. In this embodiment, because vector-slip wheels are potentially decoupled from their support surface, it is no longer possible to drive them using belts as shown in FIG. 12. Each wheel must be individually actuated using separate drive means. While more complex, this arrangement is the only one of the aforementioned systems which permits simulation of complex tasks such as climbing stairs while retaining the advantage of an ODT.

Figure 13:
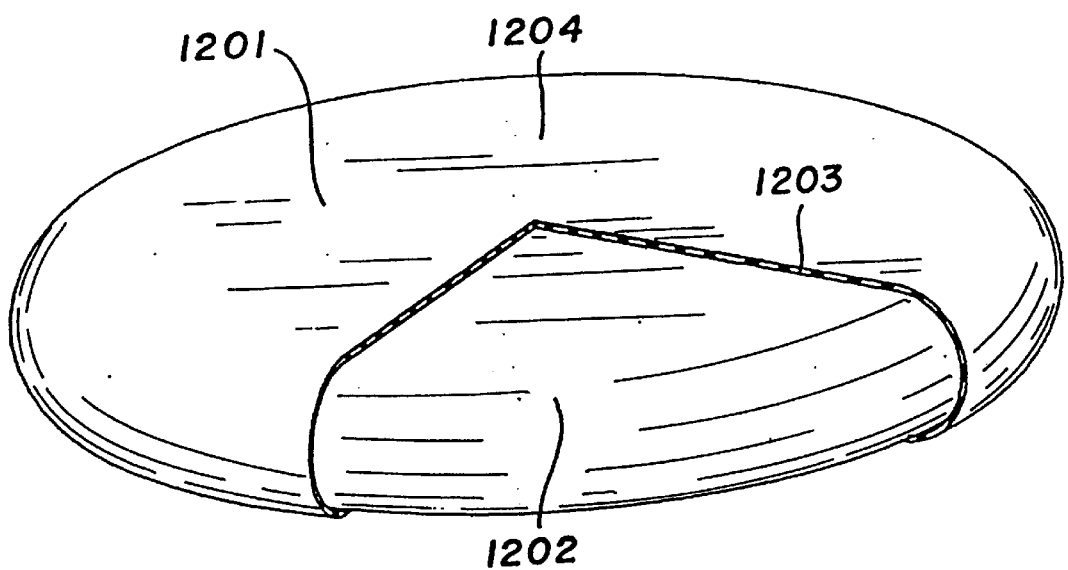
FIG. 13 is a perspective view partly sectioned of a spheroid treadmill segment.

FIG. 13 reveals yet another embodiment of an ODT which employs a moveable, continuous, active surface 1201 that wraps around a flattened spheroid 1202. The active surface 1201 is held onto the surface of the spheroid by its own elasticity, and the contact zone between the rigid spheroid and the moving surface 1203 is relatively frictionless. By sliding the active surface around the spheroid by its own elasticity, and the contact zone between the rigid spheroid and the moving surface 1203 is relatively frictionless. By sliding the active surface 1201 around the spheroid, the flat portion at the top of the spheroid 1204 will serve the same function as the active surface of earlier figures.

Figure 14:
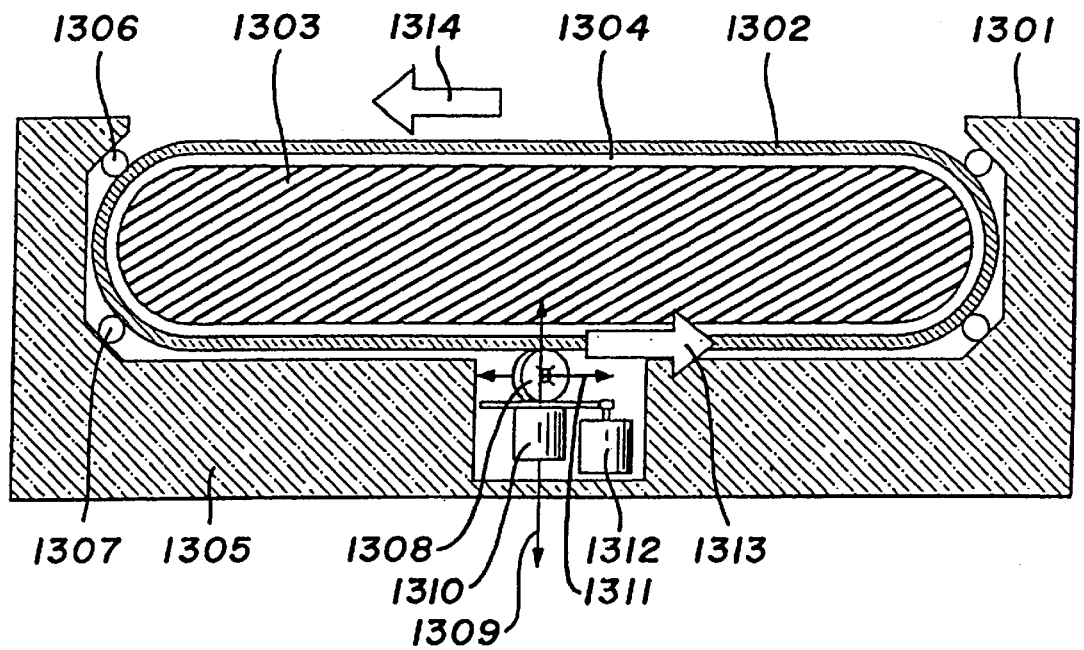
FIG. 14 is a sectional view of the segment of FIG. 13 incorporated in a track assembly.

FIG. 14 is a cross section of the fully implemented spheroid construction of FIG. 13. The ODT 1301 shows an active surface 1302 which stretchably surrounds the rigid spheroid 1303, separated by a relatively frictionless layer 1304. The housing 1305 retains the active surface and spheroid by mounting passive casters which substantially retain the top 1306 and bottom 1307 contours of the fundamentally spheroid shape, and by presenting a slight overhang to retain motion of the assembly in the upward direction.

The active surface is controllably actuated by frictional contact with a steerable roller 1308. The roller 1308 is steerable about two axes. Axis one 1309 is powered by a motor 1310 about the roller itself, thus driving the bottom side of the active surface by frictional contact. Axis two 1311 driven by motor 1312 provides steerability of the roller so that the roller can direct its thrust vector in a full circle. A thrust vector provided by the roller causes the active surface to slide around the spheroid. As depicted, with the roller providing thrust on the lower surface substantially in the +X 1313 direction, the upper surface responds in the –X 1314 direction.

Figure 15:
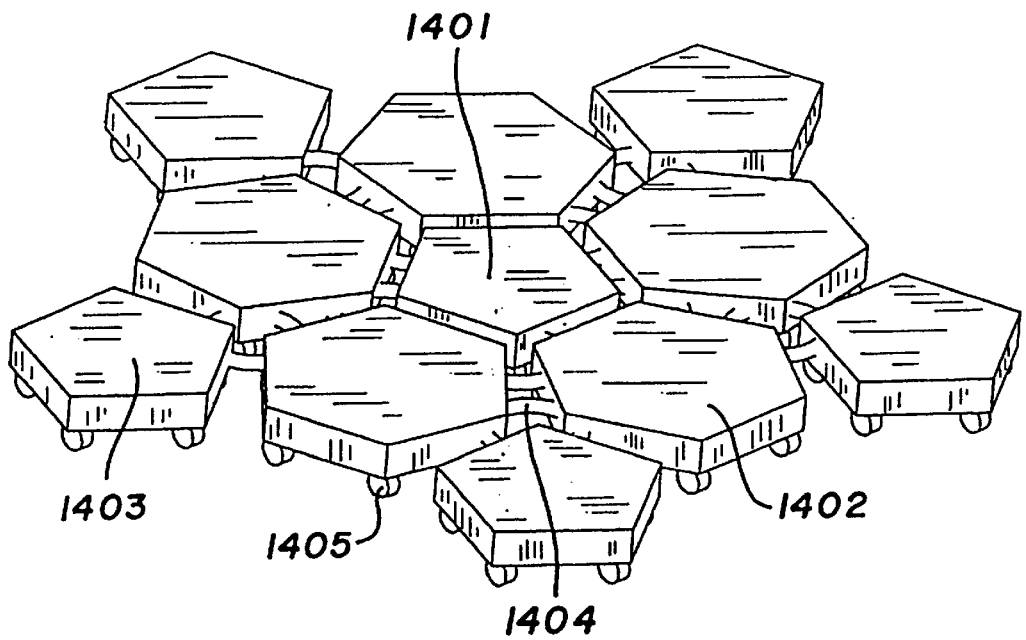
FIG. 15 is a perspective view of another modification of the active surface of the track assembly.

FIG. 15 details one potential embodiment of a small area of the active surface 1401. A pattern of rigid plates is arranged to form an array of hexagons 1402 and pentagons 1403, much like the surface of a soccer ball. Corners of the plates are held together elastically 1404, so that the surface may expand and contract appropriately as it traverses the spheroid. the underside of each plate is suitably supported by an arrangement of casters 1405 which are pressed into the rigid material of the plate. The casters 1405 permit contact between the plate and the spheroid to be low in friction, as required for proper function.

An improvement on the embodiment of the powered roller 1308 of FIG. 14 would be to split the roller function into two rollers actuated by differential gear unit. It may then still be powered by two motors as revealed above, however it would gain the advantage of minimizing rotational friction during steering, much the same way an automobile differential permits the drive wheels of a turning car to rotate at their own speed.

In is understood that the surface construction of FIG. 15 is exemplary, and represents only one of a class of surface constructions which fulfills the function of a flexible, low-friction active surface interacting with a contained, flattened, spheroid.

Advanced System Configurations

Although the basic system configuration includes a support cuff for assistance of balance and optionally for tracking user orientation, it also has the potential to completely like and support the user. A strengthened and fully actuated support strut connected to a fully supporting cuff and harness enables a user to be lifted up from the active surface and move within the confines of the mechanically limited motion envelope. A system of this type would allow a user to transition between active surface locomotion and free-body flight.

In a similar fashion, the entire active surface and related mechanism may be mounted upon a motion platform which permits various combinations of linear and angular motions of the surface. A tipped surface is useful for simulating an inclined surface in virtual space, like a user might encounter when walking up a virtual hill. A surface which moves up and down as well as angularly can simulate the deck of a ship, or the cabin aisle of an aircraft.

Figure 16:
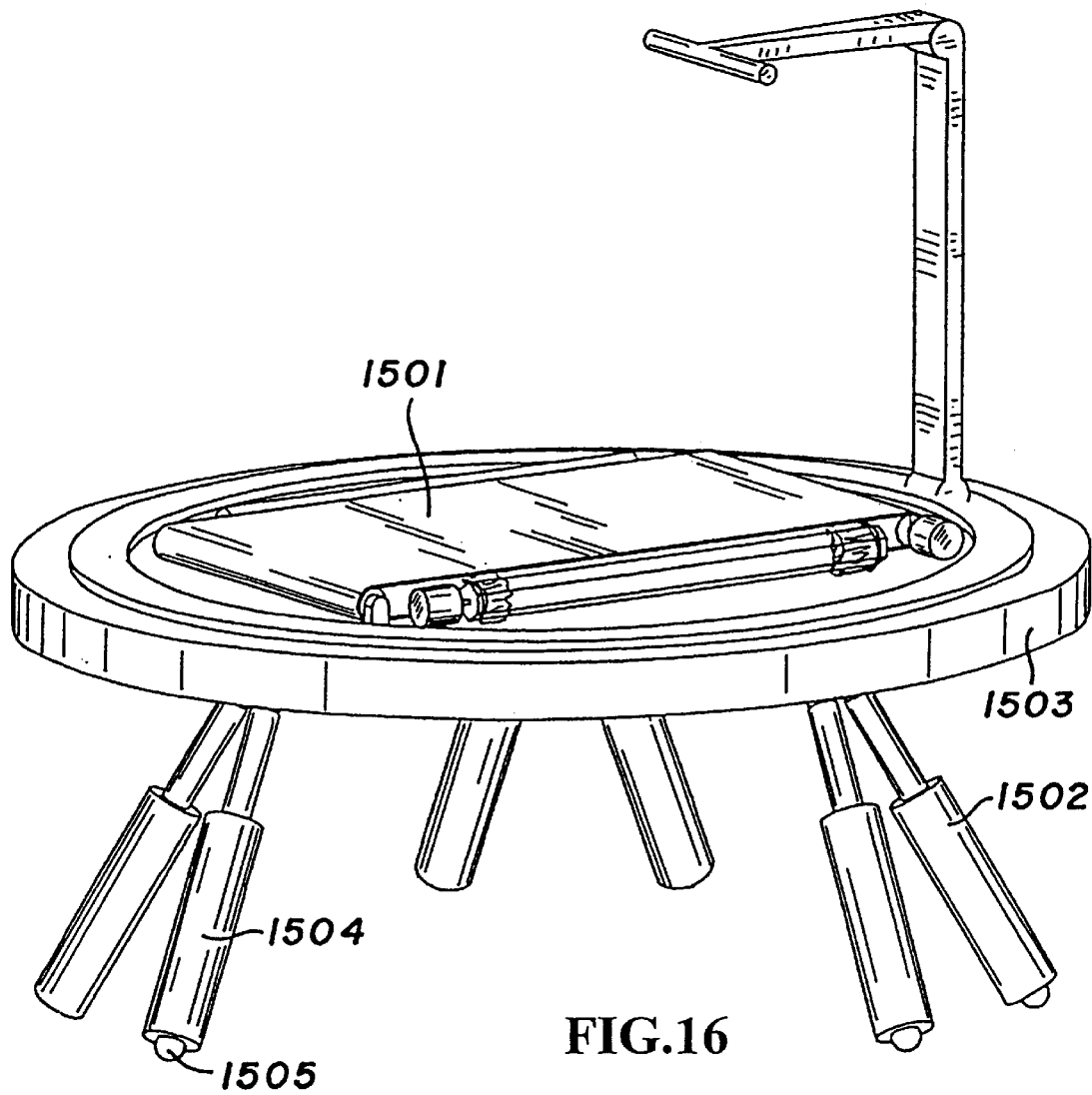
FIG. 16 is a perspective view of FIG. 4 combined with a hexapod motion platform.

FIG. 16 depicts the combination of the simplified ODT of FIG. 4 1501 with a standard 6 degree-of-freedom hexapod motion platform 1502. The base of the ODT 1503 serves as the attachment point for the six linear actuators 1504 which comprise the hexapod. Control of said cylinders provides full 6 DOF motion, and the control of said hexapod structure is well known to those skilled in the art of motion control. Cylinders are attached by ball joints to ground 1505, and by ball joints to the base 1503. Said cylinders may typically be actuated by hydraulics, pneumatics, or by a ball screw mechanism. The power and control means for the hexapod and ODT are omitted from the figure, but are understood to include a power conditioning means, a position sensing means, a control computer, and a control loop of the type described in FIG. 2. It is also understood that the ODT which attaches to the hexapod might just as easily be of the construction of FIGS. 1, 3, 5, 9, 10, 12, 13 or 14.

Combining the ODT with an enclosed simulator such as the spherical motion environment developed by Virtual Space Devices, Inc. would permit not only 3 to 6 DOF to be applied to the active surface of the ODT, but would also allow transitioning between walking, free-body flight, and vehicular simulation.

An ODT need not be the main interface device for an immersive system. It might, for example, be complimentary to a vehicle simulator. A standard simulator for a vehicle such as a jeep, mounted on a hexapod motion platform, could be placed adjacent to an ODT. As the user emerges from the vehicle simulator, the ODT would be positioned at virtual ground so that the user experiences a smooth transition between vehicular transport and ground motion.

Figure 17:
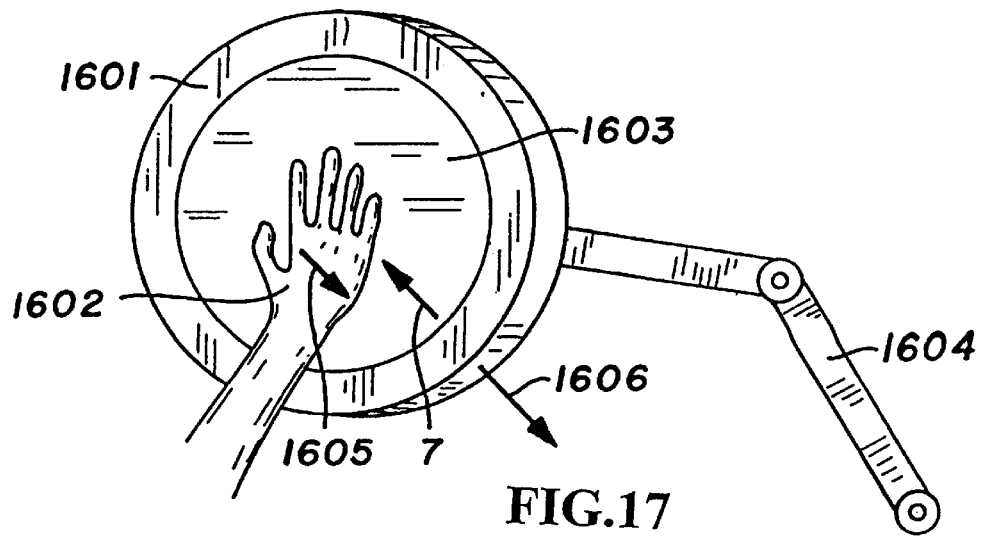
FIG. 17 is a perspective view of an active surface haptic display.

The unique, omni-directional qualities of an active surface such as those revealed therein may be employed in yet another way. As a haptic display device, an active surface is able to convey a sense of friction to a user as they run their hand along a surface. FIG. 17 presents an embodiment for a active-surface haptic display 1601. As the user's hand 1602 reaches out to contact a virtual object, the active surface 1603, which is only slightly larger than the major diameter of the user's palm print, is placed by a robotic mechanism 1604 where the user expects that surface to be. As the user moves their hand along the surface in one vector direction 1605, the haptic display mirrors the motion of the hand 1606, while the active surface creates an equal and opposite counter vector 1607 by moving its surface counter to the motion of the hand. The user resultingly feels the friction of the virtual solid's surface as the hand is rubbed across the moving surface. Because of the omni-directional nature of the active surface, the hand may trace an arbitrary path.

In its basic form, the active surface is flat both because the support surface behind the activation means is most easily fabricated as a flat surface, and because the interlinked nature of the active means tends to prevent creation of surface contour. A flat surface will be effective for simulating a flat virtual solid, but it can only approximate a curved solid. A moderate amount of curvature may be achieved, however, by bowing might be accomplished using pressurized air behind a thin and flexible support surface. The amount of bowing may be controlled to correspond to the average curvature at the user's contact point with the virtual solid.

Description of the preferred embodiment as including an HMD, gloves, body suit, etc. does not exclude other applicable system configurations. There are a number of additional display options which may advantageously employ an ODT. For example, Myron Krueger's original display method employs large display screens which surround the user. Spherical display surfaces have been employed for a number of years by various companies such as IMAX theater, or Evans & Sutherland. Most recently Evans & Sutherland, Inc. revealed a spherical viewing structure which essentially surrounds the user to provide a nearly fully spherical viewing surface. A projected image tracks the user's viewing cone and displays the appropriate scene. An advanced display method being developed by the Human Interface Technology Lab places light directly on the retina of the eye using a weak laser beam. Any of these display systems and their related interfaces can benefit by use of the ODT.

Telepresence

Discussion of a VR system would not be complete without mention of telepresence. While VR system substantially synthesize the user's sensory experience, telepresence systems extract their sensory information from a real, remote source and convey it to the senses of the user. In the simplest example, a pair video cameras might be mounted on a degree-of-freedom platform whose motion is slaved to the user's head. An HMD on the user's head receives the stereo images from the paired video cameras thus creating the visual illusion that the user's head is sitting on the platform instead of the two cameras! A system is this type which also includes sound is commercially available from Telepresence Research, Inc.

With regards to the ODT, it is feasible to couple the walking motion of the user to the lateral movement of a remote sensing device. Using natural walking and turning motion to steer and guide a remote device has the advantage of freeing both hands to perform other tasks rather than being restricted to a steering device like a joystick. A coupling of the telepresent remote with the user would likely include, besides the ODT, a video, a video and sound link. Other system configurations might include one or two hand operated actuators which the operator uses to preform manipulation tasks at the remote site.

Figure 18B:
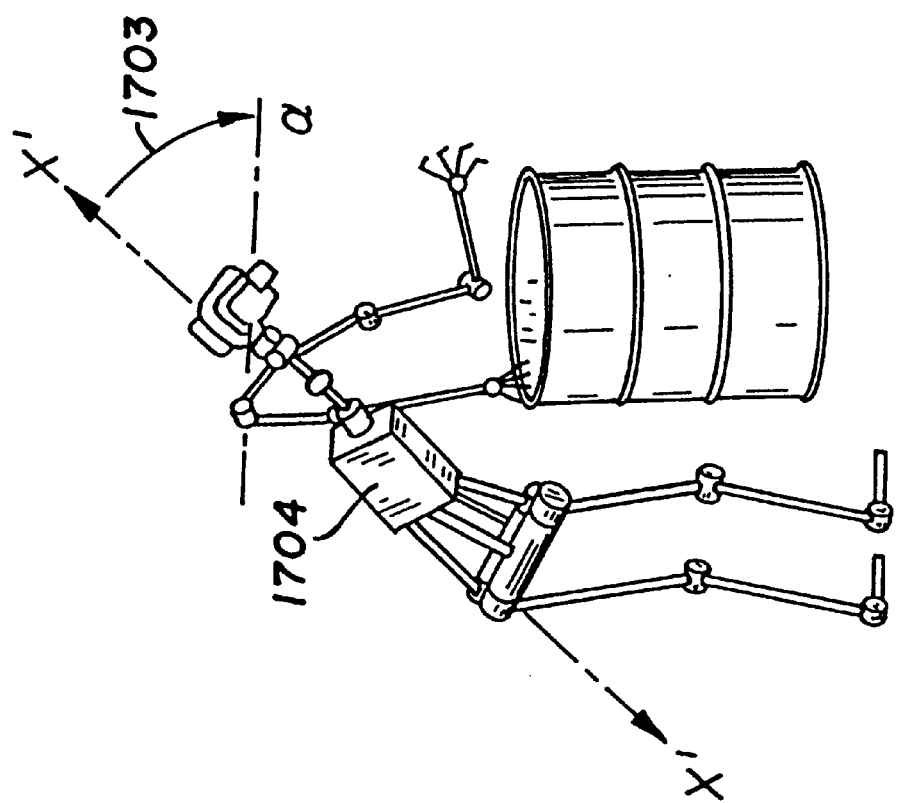
FIG. 18a and 18b are diagrammatic views showing the user at one site to control a remote at a distal site.
Figure 18A:
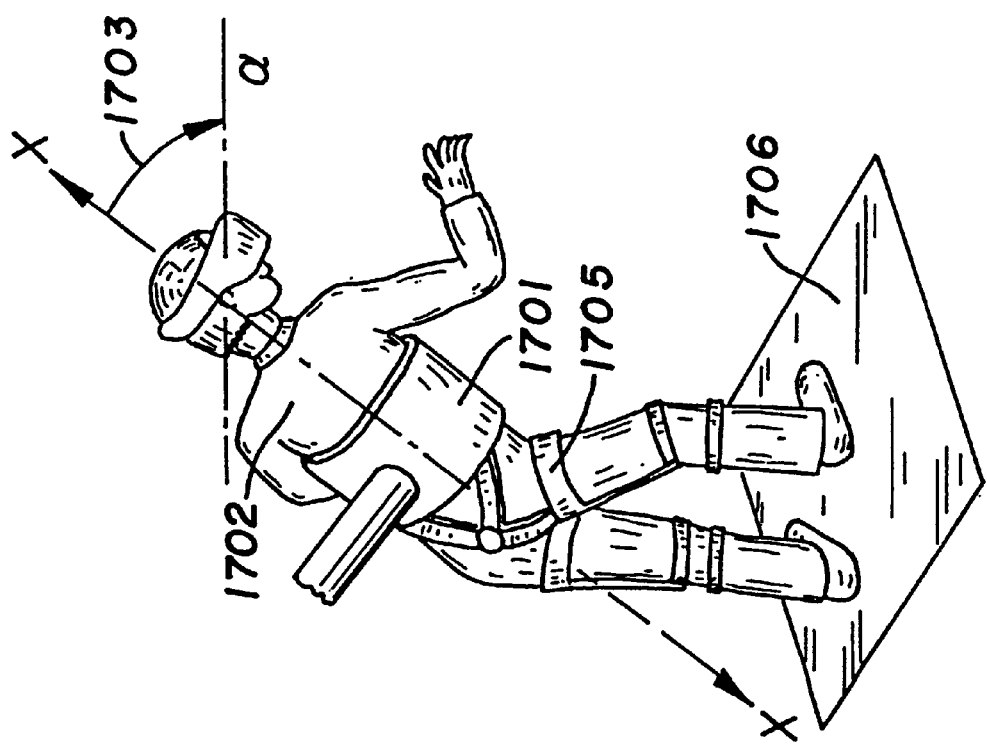

FIGS. 17a and 17b show a system in which a user at one site, FIG. 18a, controls the remote at a distal site, FIG. 18b. This advanced form of ODT and telepresent coupling would employ not only the above-mentioned systems, but also a means of conveying the remote's physical orientation. This is accomplished by using the balance cuff 1701 to force the user 1702 into the orientation 1703 of the remote 1704. Feedback on the cuff by the user, in turn, also forces the remote into the orientation of the user. By combining this orientational interplay with a bipedal remote and an exoskeletal structure 1705 which links the remote's legs to the user's legs, it is possible for the remote to balance itself in both standing and walking modes. Combination of the above structures to enable locomotion of the remote is made possible because the user is standing on an ODT active surface 1706 which permits the user to employ their natural balance abilities as they navigate using the electronic eyes of the remote.

Figure 19:
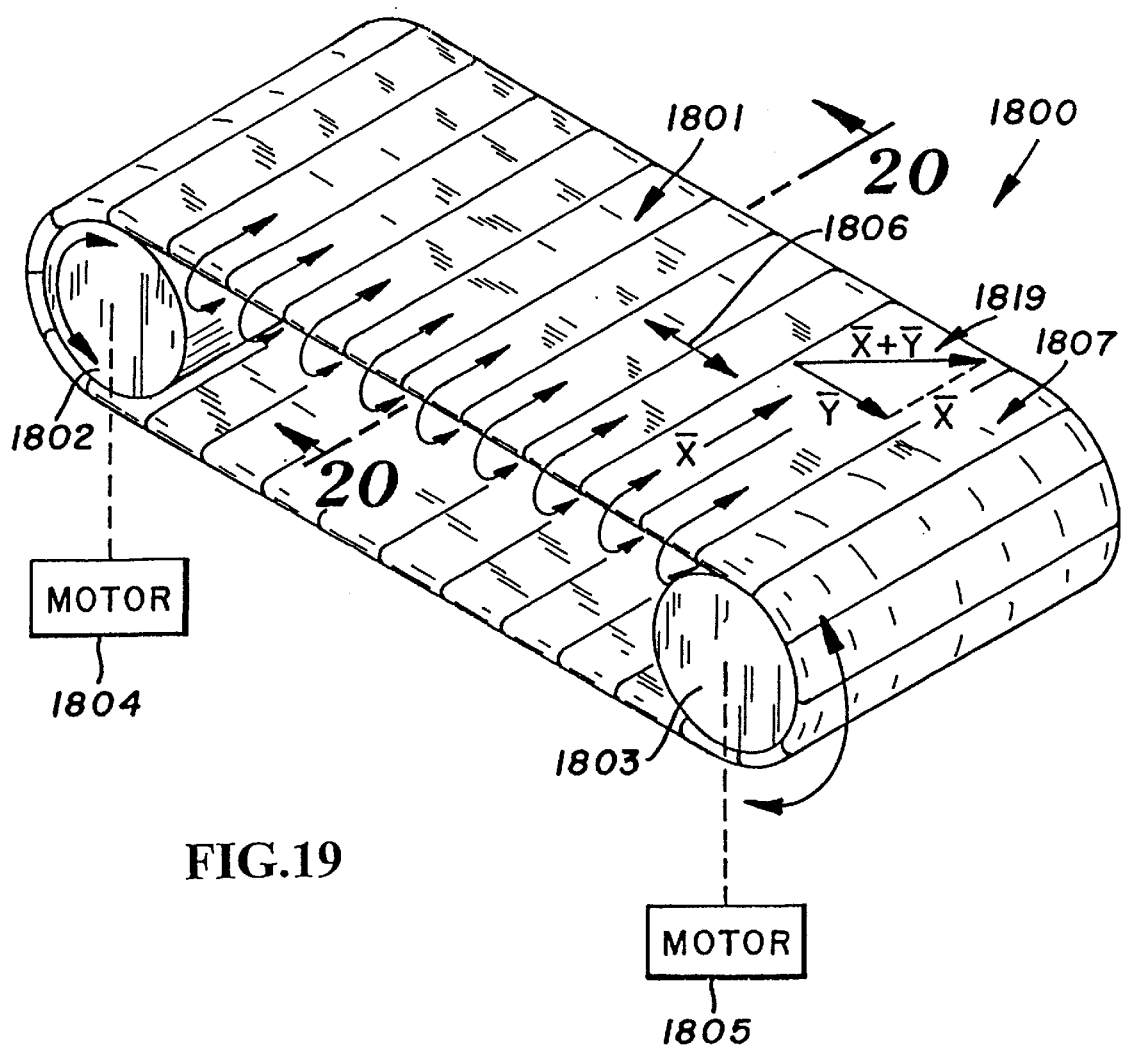
FIG. 19 is a perspective view is a further modification of the track assembly useable with the treadmills of FIGS. 1 to 5.

FIG. 19 is a further modification of the track assembly for an omni directional treadmill indicated generally at 1800 for creating an omni-directional surface on a continuous or endless belt 1801. Belt 1801 is trained about drive rollers 1802 and 1803 powered by motors 1804 and 1805. The relative speeds of motors 1804 and '805 can be adjusted to maintain the upper run of belt 1801 in tension. Motors 1804 and 1805 are reversible electric motors operable to longitudinally move belt 1801 in forward and reverse directions, shown by arrow 1806. A single motor driving worm gears driveably connected to rollers 1802 and 1803 can be used to concurrently drive rollers 1802 and 1803 to selectively move belt 1801 in opposite longitudinal directions.

Figure 20:
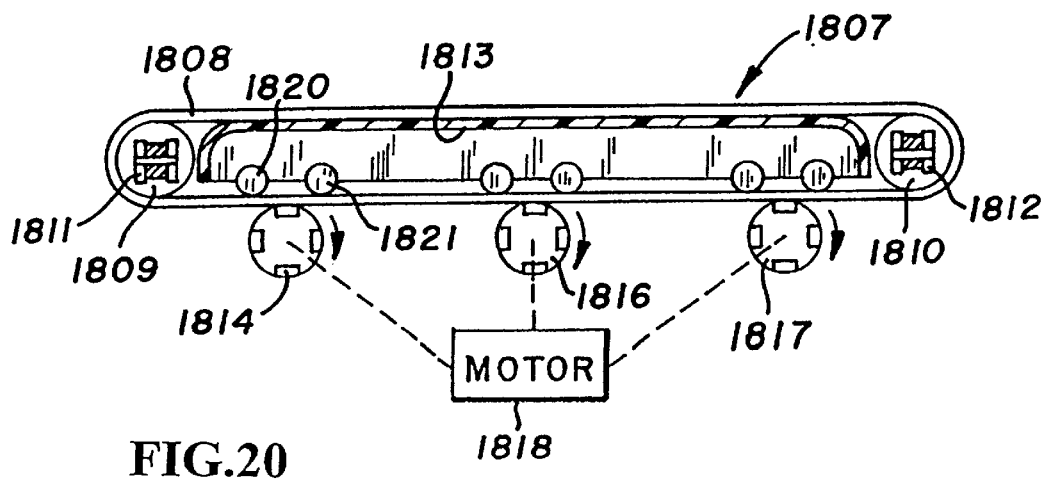
FIG. 20 is a section view taken only line 20—20 of FIG. 19.

Belt 1801 comprises a plurality of individual transverse members or segments 1807 positioned side-by-side along the length of belt 1801. As shown in FIG. 20, each segment 1807 has an endless transverse belt 1808 trained about cylindrical members or rollers 1809 and 1810. Rollers 1809 and 1810 are rotatably mounted on platform 1813. One of rollers 1809 or 1810 may be attached to platform 1813 through a spring mechanism to maintain tension on the belt. Rollers 1809 and 1810 can be rotatably mounted on endless chains or cables 1811 and 1812 that extend around drive rollers 1802 and 1803. A support platform 1813, coated with a slippery material, such as Teflon, is located below the upper run of belt 1808. Belt 1808 is free to ride on platform 1813 and support a person walking or running on belt 1801. Platform 1813 has opposite ends rotatably supporting rollers 1809 and 1810 to maintain the spacing between the rollers.

The lower run of belt 1808 is located in driving engagement with a plurality of wheel assemblies 1814, 1815, and 1817. An example of the detailed structure of a wheel assembly is shown in FIG. 11. A motor 1818 concurrently rotates all wheel assemblies to transversely drive belt 1808 in selected opposite directions and at regulated speeds. Three wheel assemblies 1814, 1816, and 1817 are shown in driving contact with belt 1808. Additional wheel assemblies can be used to support and drive the lower run of belt 1808. the wheel assemblies 1814, 1816 and 1817 are vector slip wheels that permit actuation about the central axis of the wheel while permitting transverse motion about the central axis due to the motions of the multiple rollers or sleeve places around each wheel. These rollers are free to rotate about each of their own axis. Support of individual rollers by vector slip wheels permits free movement of belt 1808 along the Y direction, and permits powering the belt 1808 in the X direction by actively powering one or more vector slip wheels which, in turn, convey their rotary motion to the linear notion of the belt 1808 through generally frictional contact with that belt. Opposite each wheel assembly 1814, 1815 and 1817 are a pair of idler rollers 1820 and 1821 which permit relatively frictionless conveyance of shear force between the wheel assembly and belt 1808.

Figure 21:
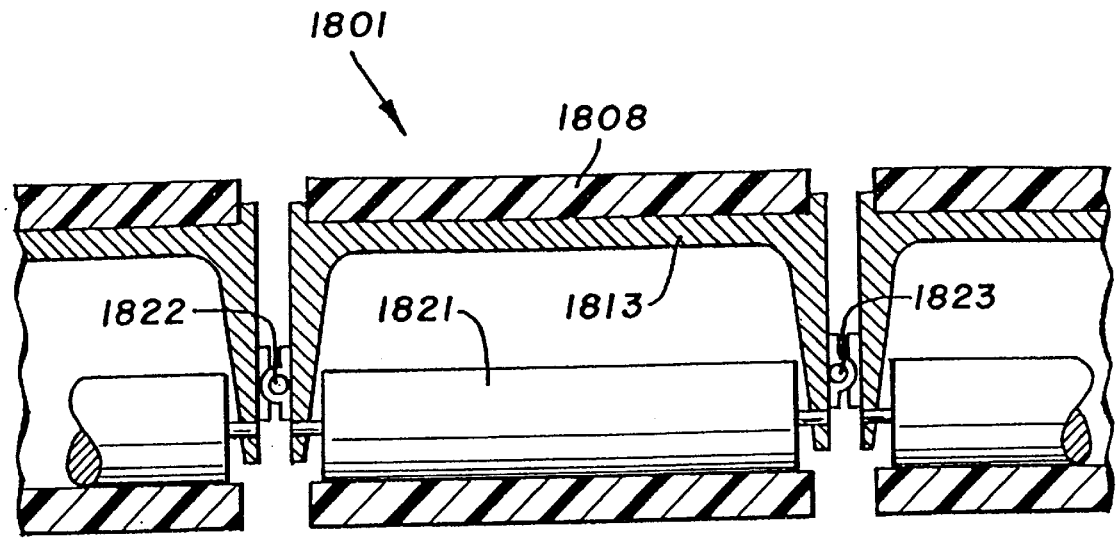
FIG. 21 is a enlarged cross sectional view of a portion of the bell assembly.

As shown in FIG. 21, platform 1813 is an inverted U-shaped or channel member having a flat top surface for supporting the upper run of belt 1808. The idler rollers 1821 are journaled to the downwardly extended side walls of platform 1813. The bottom run of belt 1808 rides on idler rollers 1821 during transverse movement of belt 1808 upon rotation of vector thrust wheels 1814, 1816 and 1817. Adjacent platforms are articulately connected with hinges 1822 and 1823 to allow the belt assembly 1801 to move around drive rollers 1802 and 1803.

Belt 1808 moves transversely or perpendicular to the direction of movement of belt 1801. By simultaneous motions of belts 1801 and 1808, the active surface or top of belt 1801 is able to provide motion in any direction through the vector sum of individual X and Y motions as illustrated at 1819 in FIG. 19. The advantages of omni-directions treadmill 1800 include a minimum number of parts and less weight than roller belt treadmills. The treadmill is economical to fabricate and can be assembled in a reasonable period of time. It is durable and reliable in operation to provide a large active surface that is effectively movable in all two dimensional directions.

Figure 22:
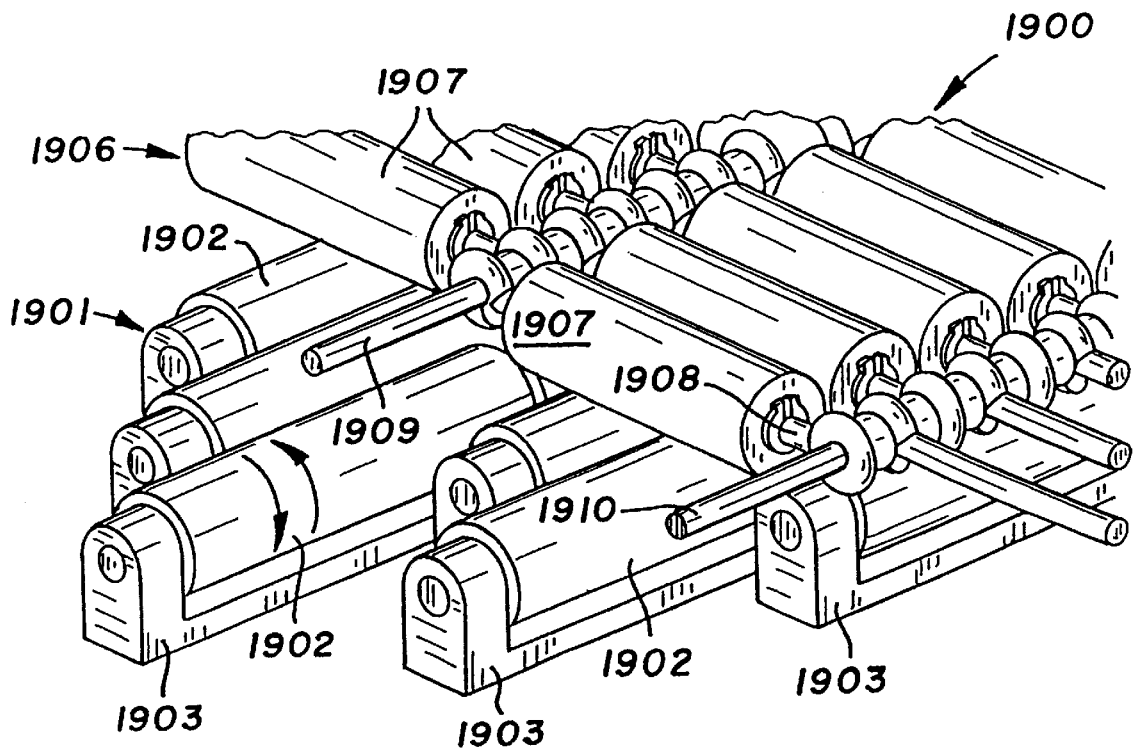
FIG. 22 is a perspective view of a section of yet another modification of the track assembly of the omni-directional treadmill of the invention.
Figure 23:
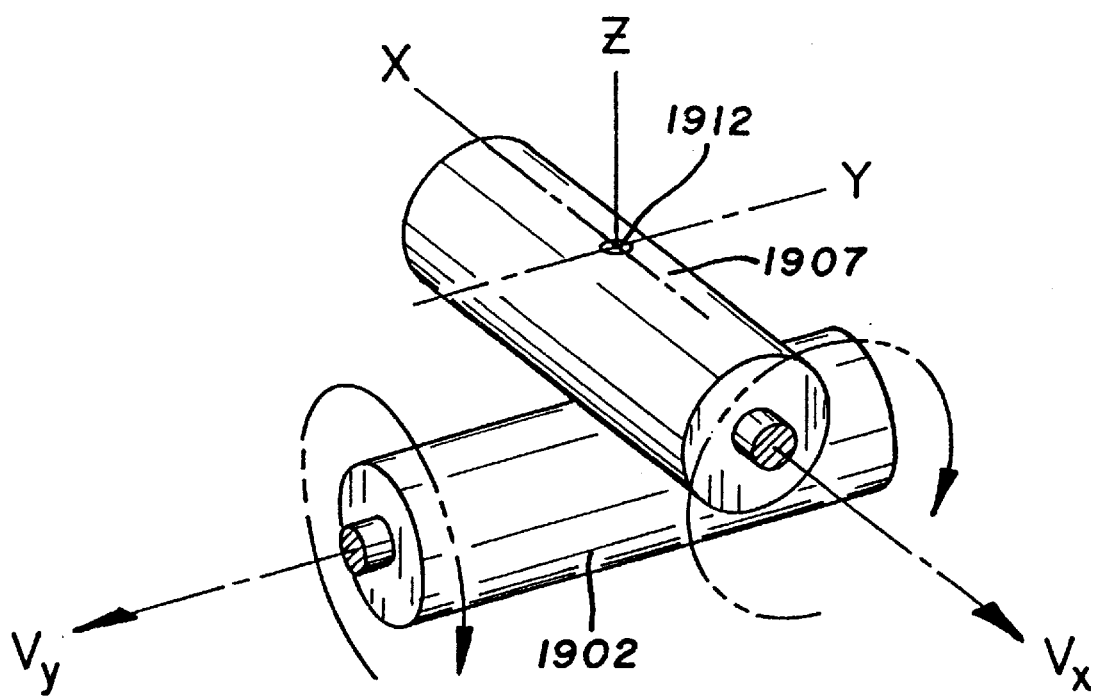
FIG. 23 is an enlarged perspective view of the longitudinal roller and transverse roller illustrating the X and Y vector due to rotation of the rollers.
Figure 24:
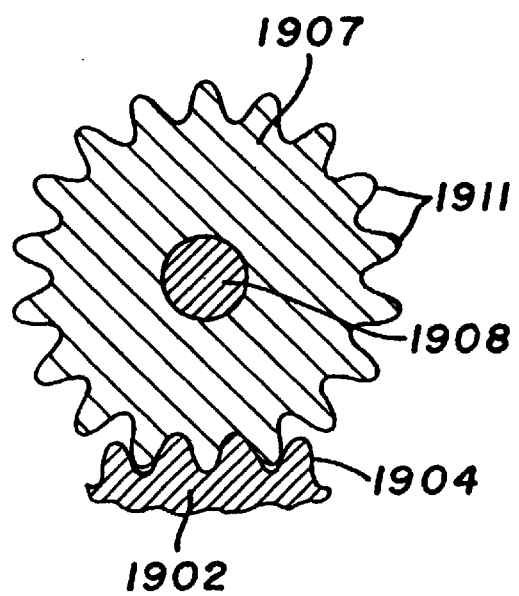
FIG. 24 is a transverse cross section of longitudinal roller located in engagement with the transverse roller.

Another embodiment of the omni-directional treadmill mechanism indicated generally at 1900 is shown in FIG. 23 to 24. A first belt 1901 has a plurality of rollers 1902 rotatably mounted on U-shaped cradles 1903. Cradles 1903 are connected with longitudinal pivot members or pins into an endless belt having a plurality of rollers 1902. Adjacent rollers 1902 overlap each other as shown in FIG. 22. Belt 1901 is mounted on a support endless belt that is trained over longitudinal drive rollers journeyed on a frame. A motor connected to at least one drive roller operates to transversely move support belt and belt 1901. Each roller 1902 has circumferential teeth 1904 shown in FIG. 24. The teeth 1904 extend circumferentally around the roller. The cradles 1903 are captured or attached to the endless support belt that is powered in a transverse direction in response to a control that responses to movements of the user.

A second belt 1906 has a plurality of longitudinal orientated rollers 1907. Each roller 1907 is rotatably mounted on a longitudinal rod 1908. Opposite ends of each rod 1908 are turned about transverse rods 1909 and 1910. This locates rollers 1907 side-by-side each other in transverse rows. The rods 1909 and 1910 pivotally connect the transverse rows of rollers 1907 to form the endless second belt 1906. Opposite ends of belt 1906 are trained over transversal rollers or drums. At least one roller is power driven with a motor coupled to the control. The control selectively operates the motors for the first and second belts in response to movement of the user on the active surface of the first belt. As shown in FIG. 24, roller 1907 has longitudinal teeth 1911 that engage the teeth 1904 of roller 1902. Transverse movement of the first belt 1901 causes rollers 1907 to rotate on rods 1908. In use, the lower rollers 1902 frictionally contact the lower portion of upper rollers 1907, conveying their Y motion by ignoring any X motion component. The upper rollers 1907 pass through the Y motion from the lower or first belt 1901 and contribute their own X motion. The second belt 1906 moving in the X direction contributes to the surface motion vector in the X direction only. The first belt 1901 with cradled rollers 1902 contributes to the surface motion vector in the Y direction only. Combined motion of the two belts 1901 and 1906 permits creation of a complete circle of motion vectors.

FIG. 23 shows a more detailed description of the interaction of two individual rollers 1902 and 1907 of the mechanism. A roller belt roller 1907 traveling with velocity V in the X direction 1902 and 1907 has velocity V in the minus Y direction. Linear action of the upper roller in the X direction is passed without friction by the supportive lower roller, and causes the lower roller to rotate about its axis. At the same time, the lower roller actively powers the upper roller 1907 so that it rotates about its own axis.

Choosing a global coordinate system with 0, 0, 0 at point 1912 we see that the point has a combined surface vector set which is the combination of the linear action in X and the rotary action about X. In the Vector Detail we see that the instantaneous velocity, V, of 1912 is the vector sum of linear velocity V and the rotationally transferred linear velocity V, now reversed in direction.

The entire contact line along X at the top of the upper roller contains the required vector set which produces vector V. All the other rollers comprising the upper surface of the roller belt contain this vector set as well.

Since the contact lines at the top of each roller 1907 are moving in concert, a mass resting on the active surface defined by the sum of the contact lines is moved in the direction of the combined X and Y motion vectors.

A roller-belt ODT design is readily manufacturable, easily powered, and relatively compact.

Since the basic mechanism permits line contact at the active surface, and the lines are minimally spaced on the order of 1.5 cm, and since each contact line contains both X and Y vector components, there are few restrictions on the types of loading or the nature of the load's contact surface. A user will be able to crawl as well as walk. A shoe with a waffled sole design will fare as well as a flat-bottomed loafer.

The treadmill mechanism 1900 works in synchrony with the VR system by sending velocity and direction signals to the image generation computer. The computer uses the velocity vector thus provided to update the image which is shown to the user so that the user sees a visual image which takes into account this vector. For example, if the user's velocity is ½ meter/sec in the X direction as indicated by the X direction motion of the treadmill, the user will observe objects within the virtual world passing by at ½ meter/sec in the minus X direction.

I claim:

1. An apparatus for allowing a user to walk or run in any arbitrary direction having a frame, a track assembly mounted on the frame, the track assembly having a user active surface means for supporting the user walking or running thereon characterized by the user active surface means having a plurality of side-by-side endless first belts, sleeve means for accommodating opposite ends of the first belts whereby the first belts can be moved around the sleeve means, support means for each first belt located between the sleeve means, means for pivotally connecting adjacent support means to provide an endless second belt, roller means mounted on the frame supporting opposite ends of the second belt, first drive means for rotating at least one of the roller means to move the second belt in a first direction, and second drive means for moving the second belt in a second direction whereby the combined movements of the first and second belts results in omni-directional user movement of the active surface means, and controls means responsive to directional orientation of the user on the user active surface means to selectively control the operation of the first and second drive means thereby control the directional user movement to conform with the orientation of the user on the user active surface.

2. The apparatus of claim 1, wherein the support means for each first belt comprises an inverted U-shaped member having a generally flat top surface for supporting the upper run of the first belt, side means including hinge means articulately coupling adjacent portions of the inverted U-shaped member.

3. The apparatus of claim 1, including idler rollers mounted on the support means engageable with the bottom runs with the first belts, said second drive means being engageable with the second belts to hold the bottom run of the first belts in engagement with the idler rollers.

4. The apparatus of claim 1, wherein the second drive means include vector thrust wheels engageable with the second belts, and means for rotating said wheels thereby moving the second belts in the second direction.

5. The apparatus of claim 1, wherein the control means includes a closed loop position control to maintain position of the user toward the center of the user active surface means in response to user traversal of the user active surface means.

6. The apparatus of claim 1, wherein the control means includes adapting means adapted to be coupled with the user to actively track the motion of the user and to assist the user in maintaining the balance.

7. The apparatus of claim 6, wherein the adapting means adapted to be coupled with the user includes a cuff connectable to the user.

8. The apparatus of claim 6, wherein the adapting means adapted to be coupled with the user includes handle means adapted to be grasped by the user to assist the user in maintaining the balance.

9. The apparatus of claim 1, wherein the control means includes virtual reality means responsive to directional orientation of the user on the user active surface means, said virtual reality means having a visual display for displaying visual images, a display control means for projection of the visual images, speaker means for generating audible sounds, a microphone for the user, means for sensing the position of the user on the user active surface means, and means for connecting the visual display, display control means and speaker means for generating images and sounds, respectively.

10. The apparatus of claim 9, wherein said virtual reality means further includes interactive solids for providing the user with haptic feedback.

11. The apparatus of claim 1, wherein the control means includes force feedback means operable to apply an external force to the user.

12. A track assembly for an omni-directional treadmill for allowing a user to walk or run in any arbitrary direction comprising: user active surface means for supporting the user walking or running thereon, said user active surface means having a plurality of side-by-side endless first belts providing an endless first belt assembly, sleeve means for accommodating opposite ends of the first belts whereby the first belts can be moved in a transverse direction around the sleeve means, support means for each first belt located between the sleeve means, means for pivotally connecting adjacent support means to provide an endless second belt assembly, roller means supporting opposite ends of the second belt assembly for movement in a longitudinal direction, first drive means for moving the second belt assembly in the longitudinal direction, second drive means for moving the first belt assembly in the transverse direction whereby the combined movements of the first belt assembly and second belt assembly results in omni-directional user movement of the active surface means, and control means responsive to direction orientation of the user on the user active surface means to selectively control the operation of the first and second drive means thereby control the directional user movement to conform with the orientation of the user on the user active surface means.

13. The track assembly of claim 12, wherein the support means for each first belt comprises an inverted U-shaped member having a generally flat top surface for supporting the upper run of the first belt, side means including hinge means articulately coupling adjacent portions of the inverted U-shaped member.

14. The track assembly of claim 12, including idler rollers mounted on the support means engageable with the bottom runs with the first belts, said second drive means being engageable with the second belts to hold the bottom run of the first belts in engagement with the idler rollers.

15. The track assembly of claim 12, wherein the second drive means include vector thrust wheels engageable with the second belts, and means for rotating said wheels thereby moving the second belts in the second direction.

16. The track assembly of claim 12, wherein the control means includes a closed loop position control to maintain position of the user toward the center of the user active surface means in response to user traversal of the user active surface means.

17. The track assembly of claim 12, wherein the control means includes adapting means adapted to be coupled with the user to actively track the motion of the user and to assist the user in maintaining the balance.

18. The track assembly of claim 17, wherein the adapting means adapted to be coupled with the user includes a cuff connectable to the user.

19. The track assembly of claim 17, wherein the adapting means adapted to be coupled with the user includes handle means adapted to be grasped by the user to assist the user in maintaining the balance.

20. The track assembly of claim 12, wherein the control means includes a virtual reality means responsive to directional orientation of the user on the user active surface means, said virtual reality means having a visual display for displaying visual images, a display control means for projection of the visual images, speaker means for generating audible sounds, a microphone for the user, means for sensing the position of the user on the user active surface means, and means for connecting the visual display, display control means and speaker means for generating images and sounds, respectively.

21. The track assembly of claim 20, wherein said virtual reality means further includes interactive solids for providing the user with haptic feedback.

22. The track assembly of claim 12 wherein the control means includes force feedback means operable to apply an external force to the user.

23. An apparatus for allowing a user to walk or run in any arbitrary direction comprising: a support, a user active surface mounted on the support for supporting the user walking or running thereon, said user active surface including a plurality of transverse endless loop members, first means mounting each loop members for selective movement in opposite transverse directions, first drive means for transversely moving the loop members, second means for connecting adjacent first means to provide an endless loop assembly adapted to move in a longitudinal direction, second drive means cooperating with the endless loop assembly to move the endless loop assembly in a longitudinal direction whereby the combined movements of the transverse endless loop members and the endless loop assembly results in omni-directional user movement, and control means responsive to a directional orientation of the user on the user active surface to selectively control the operation of the first and second drive means thereby controlling the omni-directional user movement to conform with the directional orientation of the user on the user active surface.

24. The apparatus of claim 23 wherein the endless loop members are a plurality of side-by-side endless belts having upper runs providing the user active surface.

25. The apparatus of claim 23 wherein the first means mounting the loop members comprise cylindrical members, said loop members being located around said cylindrical members.

26. The apparatus of claim 25 wherein the second means comprises flexible members connecting adjacent cylindrical members providing said endless loop assembly.

27. The apparatus of claim 23 wherein the second drive means includes cylindrical members, and power means for rotating at least one of the cylindrical members, said endless loop assembly being located around said cylindrical members whereby rotation of the cylinderical members results in longitudinal movement of the endless loop assembly.

28. The apparatus of claim 27, wherein the power means is a motor driveably connected to at least one cylindrical member.

29. The apparatus of claim 23, wherein the control means includes a closed loop position control to maintain the position of the user toward the center of the user active surface in response to user traversal of the user active surface.

30. An apparatus of claim 23, wherein the control means includes adapting means adapted to be coupled with the user to actively track the motion of the user and to assist the user in maintaining balance.

31. An apparatus of claim 30, wherein the adapting means adapted to be coupled with the user includes a cuff connectable to the user.

32. An apparatus of claim 23, wherein the control means further includes virtual reality means responsive to the directional orientation of the user on the user active surface, the virtual reality means comprising:

a head-mounted visual display for displaying visual images;

a display control means for projecting the visual images;

speaker means for generating sounds;

a microphone for the user;

means for sensing the position of the user on the user active surface; and means for connecting the head-mounted visual display, display control means and speaker means.

33. An apparatus of claim 32, wherein the virtual reality means further includes interactive solids for providing the user with haptic feedback.

34. A method for allowing a user to walk or run in any arbitrary direction on a user active surface comprising:

providing a user active surface with a plurality of endless loop members, selectively moving the loop members in a first direction, operatively connecting adjacent endless loop members to provide an endless loop assembly, selectively moving the endless loop assembly in a second direction normal to the first direction whereby the combined movements of the endless loop members and endless loop assembly results in omni-directional user movement, and controlling the movements of the endless loop members and endless loop assembly responsive to a directional orientation of the user on the user active surface thereby controlling the omni-directional user movement to conform with the directional orientation of the user on the user active surface.

35. The method of claim 34, wherein said user active surface is provided with upper runs of side-by-side endless belts, and moving said belts in the first direction.

36. The method of claim 35, wherein the endless belts are moved in the first direction in an endless loop and the endless loop assembly is moved in an endless loop in the second direction.

* * * * *